US012707169B2

(12) United States Patent
Otake

(10) Patent No.: US 12,707,169 B2
(45) Date of Patent: Aug. 11, 2026

(54) SOLID-STATE IMAGING ELEMENT AND ELECTRONIC DEVICE

(71) Applicant: SONY SEMICONDUCTOR SOLUTIONS CORPORATION, Kanagawa (JP)

(72) Inventor: Nobuaki Otake, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 3 days.

(21) Appl. No.: 18/840,715

(22) PCT Filed: Jan. 17, 2023

(86) PCT No.: PCT/JP2023/001158
§ 371 (c)(1),
(2) Date: Aug. 22, 2024

(87) PCT Pub. No.: WO2023/171133
PCT Pub. Date: Sep. 14, 2023

(65) Prior Publication Data
US 2025/0168530 A1 May 22, 2025

(30) Foreign Application Priority Data
Mar. 10, 2022 (JP) ................................ 2022-037571

(51) Int. Cl.
*H04N 25/77* (2023.01)

(52) U.S. Cl.
CPC .................................. *H04N 25/77* (2023.01)

(58) Field of Classification Search
CPC .................................................... H04N 25/77
USPC ........................................................ 348/308
See application file for complete search history.

(56) References Cited

U.S. PATENT DOCUMENTS

2009/0244344 A1 10/2009 Takayanagi

FOREIGN PATENT DOCUMENTS

| | | |
|---|---|---|
| JP | 2013-187607 A | 9/2013 |
| JP | 2019-186819 A | 10/2019 |
| WO | 2020/121699 A1 | 6/2020 |

OTHER PUBLICATIONS

International Search Report and Written Opinion of PCT Application No. PCT/JP2023/001158, issued on Apr. 4, 2023, 09 pages of ISRWO.

*Primary Examiner* — Joel W Fosselman
(74) *Attorney, Agent, or Firm* — CHIP LAW GROUP

(57) ABSTRACT

Provided is a solid-state imaging element and an electronic device capable of suppressing a delay in response of a pixel circuit due to an increase in the number of pixels. According to the present disclosure, there is provided a solid-state imaging element including a plurality of pixel circuits that is driven according to a first signal supplied from a first signal line, a first drive circuit unit that supplies the first signal from one end side of the first signal line, and a passive circuit unit that supplies a voltage according to a level of the first signal on another end side of the first signal line, from the another end side of the first signal line.

19 Claims, 12 Drawing Sheets

FIG. 5

201: PIXEL CHIP

201b

201a

3

13

14

15

TRG

RST

SEL

VDD

VSL

VDD

VSL

2

SOLID-STATE IMAGING ELEMENT AND ELECTRONIC DEVICE

CROSS REFERENCE TO RELATED APPLICATIONS

This application is a U.S. National Phase of International Patent Application No. PCT/JP2023/001158 filed on Jan. 17, 2023, which claims priority benefit of Japanese Patent Application No. JP 2022-037571 filed in the Japan Patent Office on Mar. 10, 2022. Each of the above-referenced applications is hereby incorporated herein by reference in its entirety.

TECHNICAL FIELD

The present disclosure relates to a solid-state imaging element and an electronic device.

BACKGROUND ART

A complementary metal oxide semiconductor (CMOS) image sensor (hereinafter, CIS) has been rapidly replaced with a charge coupled device (CCD) image sensor in the related art because the CIS has high functionality and low power consumption, particularly in the field of image sensors for portable devices. Furthermore, in recent years, in the CIS, along with miniaturization of pixels, the number of pixels has been increased at a rapid rate.

However, as the number of pixels increases, resistance and capacitance between terminals of signal lines in a pixel circuit also increase. As a result, a shape of a stepwise control signal may be distorted on the terminal end side of the signal line, and a response of the pixel circuit may be delayed.

CITATION LIST

Patent Document

Patent Document 1: Japanese Patent Application Laid-Open No. 2019-186819

SUMMARY OF THE INVENTION

Problems to be Solved by the Invention

Therefore, the present disclosure provides a solid-state imaging element and an electronic device capable of suppressing a delay in response of a pixel circuit due to an increase in the number of pixels.

Solutions to Problems

In order to solve the above problems, according to the present disclosure, there is provided a solid-state imaging element including:

- a plurality of pixel circuits that is driven according to a first signal supplied from a first signal line;
- a first drive circuit unit that supplies the first signal from one end side of the first signal line; and
- a passive circuit unit that supplies a voltage according to a level of the first signal on another end side of the first signal line, from the another end side of the first signal line.

A width of the passive circuit unit in a direction in which the plurality of pixel circuits is arranged may be narrower than a width of the first drive circuit unit in the direction.

The plurality of pixel circuits may be further driven according to a second signal supplied from a second signal line.

The first drive circuit unit may supply the second signal from one end side of the second signal line.

The solid-state imaging element may further comprise

- a second drive circuit unit that supplies a signal according to the second signal from another end side of the second signal line in synchronization with the first drive circuit unit.

A width obtained by adding a width of the second drive circuit unit and a width of the passive circuit unit in a direction in which the plurality of pixel circuits is arranged may be narrower than a width of the first drive circuit unit in the direction.

The plurality of pixel circuits may be further driven according to a third signal supplied from a third signal line.

The first drive circuit unit may supply the third signal from one end side of the third signal line.

The passive circuit unit may supply a voltage according to a level of the third signal on another end side of the third signal line from the another end side of the third signal line.

The passive circuit unit may include:

- a first passive circuit that supplies a voltage according to a level of the first signal from the another end side of the first signal line; and
- a second passive circuit that supplies a voltage according to a level of the third signal from the another end side of the third signal line.

The first passive circuit and the second passive circuit may respond at different signal levels.

The passive circuit unit may include a passive circuit that supplies a voltage according to a level of the first signal from the another end side of the first signal line.

The passive circuit may include:

- a first switching element that is connected between a first potential according to a high level signal of the first signal and the another end of the first signal line;
- a second switching element that is connected between a second potential according to a low level signal of the first signal and the another end of the first signal line; and
- a drive element that brings the first switching element into a conductive state in a case where a signal level of the first signal increases to exceed a first predetermined value, and brings the second switching element into a conductive state in a case where a signal level of the first signal decreases to exceed a second predetermined value.

The drive element may bring the first switching element into a non-conductive state in a case where the signal level of the first signal is lower than the first predetermined value, and may bring the second switching element into a non-conductive state in a case where the signal level of the first signal is equal to or higher than the second predetermined value.

The first predetermined value may correspond to a value of a potential higher than the second predetermined value.

The first predetermined value and the second predetermined value may correspond to a same value.

The first switching element and the second switching element may be transistors. The drive element may supply a signal for bringing the first switching element and the second switching element into the conductive state or the non-conductive state to gates of the first switching element and the second switching element on the basis of any one of the first predetermined value and the second predetermined value.

The drive element may include:

- a first inverter that has one end connected to the another end of the first signal line and another end connected to a gate of the first switching element and has a first drive threshold value corresponding to the first predetermined value; and
- a second inverter that has one end connected to the another end of the first signal line and another end connected to a gate of the second switching element and has a second drive threshold value corresponding to the second predetermined value.

The drive element may include:

- a fourth inverter that has one end connected to the another end of the first signal line and another end connected to gates of the first switching element and the second switching element and has a third drive threshold value corresponding to at least one of the first predetermined value or the second predetermined value.

The first switching element may be a PMOS transistor, and the second switching element may be a first NMOS transistor.

The drive element may include:

- a first resistor that has one end connected to the first potential and another end connected to the another end of the first signal line;
- a second resistor that has one end connected to the another end of the first resistor and another end connected to the second potential;
- a second NMOS transistor that is connected between predetermined two points of the second resistor;
- a third inverter that has one end connected to a gate of the second NMOS transistor and another end connected to a gate of the second switching element and is connected to gates of the first NMOS transistor and the second NMOS transistor; and
- a comparator that has an inversion terminal connected to the another end of the first signal line, a non-inversion terminal connected to the another end of the first resistor, and an output terminal connected to the another end of the third inverter.

The pixel circuit may include:

- a photoelectric conversion unit that performs photoelectric conversion on incident light and accumulates signal charges.

The first signal may be a signal for reading the signal charges accumulated in the photoelectric conversion unit to a floating diffusion region.

The second signal may be

- a signal for resetting the floating diffusion region or
- a signal for reading signal charges accumulated in the floating diffusion region.

The pixel circuit may include:

- a photoelectric conversion unit that performs photoelectric conversion on incident light and accumulates signal charges.

The first signal may be a signal for reading the signal charges accumulated in the photoelectric conversion unit to a floating diffusion region.

The third signal may be

- a signal for resetting the floating diffusion region or
- a signal for reading signal charges accumulated in the floating diffusion region.

A plurality of the first signal lines may be provided.

A plurality of pixel circuits may be provided, the plurality of pixel circuits being driven according to first signals supplied from each of the plurality of first signal lines.

The first drive circuit unit may supply the first signals from one end side of each of the plurality of first signal lines.

The passive circuit unit may supply a voltage according to a level of the first signal on another end side of each of the plurality of first signal lines from the another end sides of the first signal lines.

In order to solve the above problems, according to the present disclosure, there is provided an electronic device including:

- the solid-state imaging element; and
- an optical system that guides light for imaging to the solid-state imaging element.

BRIEF DESCRIPTION OF DRAWINGS

FIG. 5 is a plan view illustrating a configuration example of a pixel chip according to the embodiment of the present technology.

MODE FOR CARRYING OUT THE INVENTION

Figure 1:
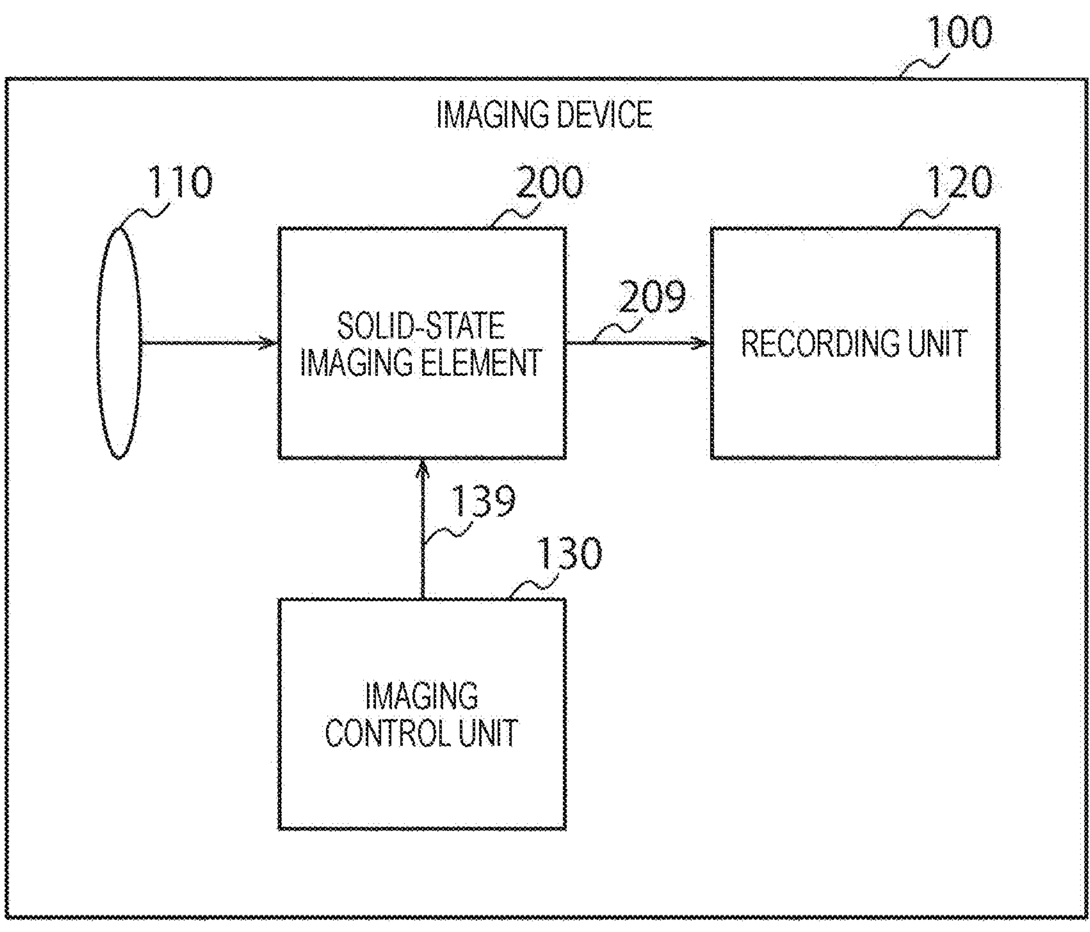
FIG. 1 is a block diagram illustrating a configuration example of an electronic device according to the present embodiment.

Hereinafter, preferred embodiments of the present disclosure will be described in detail with reference to the accompanying drawings. Note that, in the present specification and the drawings, components having substantially the same functional configuration are denoted by the same reference numerals, and redundant explanation will be omitted.

First Embodiment

[Configuration Example of Imaging Device]

FIG. 1 is a block diagram illustrating a configuration example of an electronic device 100 in the present embodiment. The electronic device 100 is, for example, a device capable of capturing an image. That is, the electronic device 100 includes an imaging lens 110, a solid-state imaging element 200, a recording unit 120, and an imaging control unit 130. As the electronic device 100, for example, a smartphone, a digital camera, a personal computer, a vehicle-mounted camera, or an Internet of Things (IoT) camera is assumed.

The imaging lens 110 condenses incident light and guides the light to the solid-state imaging element 200. The solid-state imaging element 200 captures image data under a control of the imaging control unit 130. The solid-state imaging element 200 supplies the captured image data to the recording unit 120 via a signal line 209. The recording unit 120 records the image data.

The imaging control unit 130 controls the solid-state imaging element 200 to capture image data. The imaging control unit 130 supplies, for example, a synchronization signal such as a vertical synchronization signal to the solid-state imaging element 200 via a signal line 139. Note that the electronic device 100 may further include an interface and may transmit the image data to outside via the interface. In addition, note that the electronic device 100 may further include a display unit and may display the image data on the display unit.

[Configuration Example of Solid-State Imaging Element]

Figure 2:
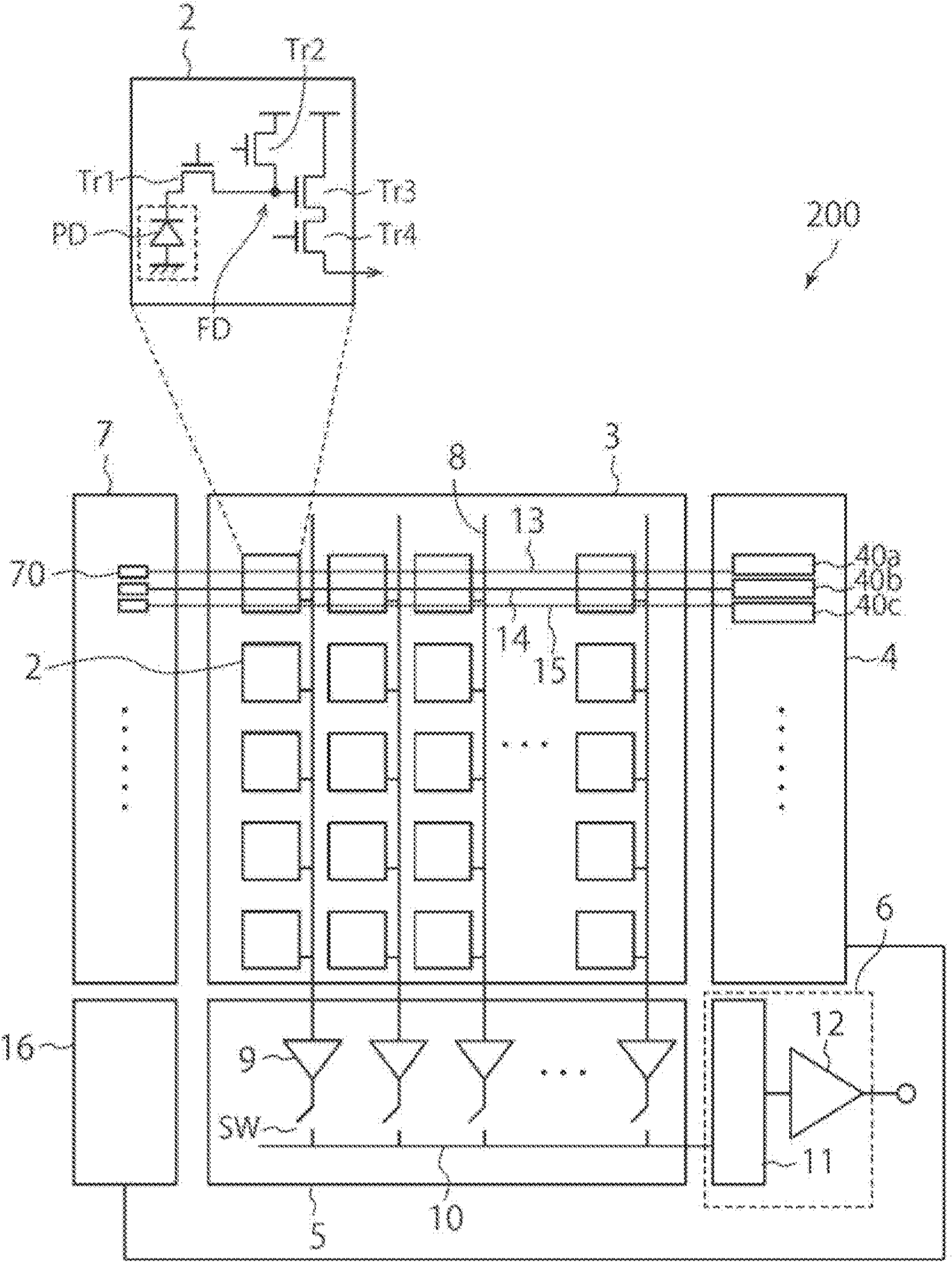
FIG. 2 is a diagram illustrating a schematic configuration of a solid-state imaging device according to the present embodiment.

FIG. 2 is a diagram illustrating a schematic configuration of the solid-state imaging element 200 in the present embodiment. As illustrated in FIG. 2, the solid-state imaging element 200 according to the present embodiment is, for example, a CMOS image sensor. The solid-state imaging element 200 according to the present embodiment includes an imaging unit (so-called pixel unit) 3 in which a plurality of pixel circuits 2 is two-dimensionally arranged with regularity, and peripheral circuits disposed around the imaging unit 3. The peripheral circuits include a drive circuit unit 4, a readout circuit unit 5, a passive circuit unit 7, and an output unit 6, and further includes a signal generation circuit 16 for generating a predetermined signal to be input to the drive circuit unit 4.

The pixel circuit 2 includes a photodiode PD that is one photoelectric conversion element and a plurality of pixel transistors (MOS transistors). In the pixel circuit 2, the photodiode PD includes a region in which photoelectric conversion is performed on incident light and signal charges generated by the photoelectric conversion are accumulated. The plurality of pixel transistors includes four MOS transistors which are a transfer transistor Tr1, a reset transistor Tr2, an amplification transistor Tr3, and a selection transistor Tr4.

The transfer transistor Tr1 is a transistor that reads signal charges accumulated in the photodiode PD to a floating diffusion region FD. The reset transistor Tr2 is a transistor that sets a potential of the floating diffusion region FD to a predetermined value. The amplification transistor Tr3 is a transistor that electrically amplifies the signal charges which are read to the floating diffusion region FD. The selection transistor Tr4 is a transistor that selects one row of pixels and reads pixel signals to a vertical signal line 8. Note that, although not illustrated, the pixel can be configured with three transistors and the photodiode PD in a state where the selection transistor Tr4 is omitted.

In the circuit configuration of the pixel circuit 2, a source of the transfer transistor Tr1 is connected to the photodiode PD, and a drain of the transfer transistor Tr1 is connected to a source of the reset transistor Tr2. The floating diffusion region FD (a region corresponding to a drain region of the transfer transistor and a source region of the reset transistor) serving as a charge-to-potential conversion unit between the transfer transistor Tr1 and the reset transistor Tr2 is connected to a gate of the amplification transistor Tr3. A source of the amplification transistor Tr3 is connected to a drain of the selection transistor Tr4. A drain of the reset transistor Tr2 and a drain of the amplification transistor Tr3 are connected to a power/potential supply unit. In addition, a source of the selection transistor Tr4 is connected to the vertical signal line 8.

The drive circuit unit 4 includes a transfer transistor drive circuit 40*a*, a reset transistor drive circuit 40*b*, and a selection transistor drive circuit 40*c*. The drive circuit unit 4 controls the transfer transistor drive circuit 40*a*, the reset transistor drive circuit 40*b*, and the selection transistor drive circuit 40*c* to supply a pulse signal as a control signal for each row of the pixel circuit 2.

The readout circuit unit 5 includes an analog-to-digital converter 9, a row selection circuit (switching unit) SW, and a horizontal transfer line 10, which are connected to the vertical signal line 8 of each column. The output unit 6 includes an amplifier, an analog-to-digital converter, and/or a signal processing circuit. On the other hand, in the present example, the output unit 6 includes a signal processing circuit 11 that processes an output from the horizontal transfer line 10 and an output buffer 12. Further, the horizontal transfer line 10 is configured with, for example, a bus signal line including the same number of signal lines as the data bit lines.

The passive circuit unit 7 according to the present embodiment includes a plurality of passive circuits 70 at a terminal end of each of the signal lines 13 to 15. That is, the passive circuit unit 7 includes passive circuits 70 of which the number is a number obtained by multiplying the number of signal lines 13 to 15 by the number of rows of the pixel circuits 2. Each of the passive circuits 70 supplies a predetermined potential from terminal end sides of the signal lines 13 to 15 according to a level of the signal received via each of the signal lines 13 to 15, for example, a potential of the signal. For example, in a case where the pulse signal supplied by the drive circuit unit 4 is at a high level, a potential corresponding to the high level is supplied from the terminal end sides of the signal lines 13 to 15. Similarly, for example, in a case where the pulse signal supplied by the drive circuit unit 4 is at a low level, a potential corresponding to the low level is supplied from the terminal end sides of the signal lines 13 to 15. Therefore, a shape of the pulse signal is prevented from being distorted on the terminal end sides of the signal lines 13 to 15. Note that a detailed configuration of the passive circuit unit 7 will be described later.

As illustrated in FIG. 2, the transfer transistor drive circuit 40*a* is connected to the passive circuit unit 7 via a transfer signal line 13. A gate of the transfer transistor Tr1 of each pixel circuit 2 is connected to the transfer signal line 13. That is, a row transfer signal TRG to be commonly applied is supplied from the drive unit 4 to the gates of the transfer transistors Tr1 of the pixel circuits 2 in one row via the transfer signal line 13.

The reset transistor drive circuit 40*b* is connected to the passive circuit unit 7 via a reset signal line 14. A gate of the reset transistor Tr2 of each pixel circuit 2 is connected to the signal line 14. That is, a row reset signal RST to be commonly applied is supplied from the reset transistor drive circuit 40*b* to the gates of the reset transistors Tr2 of the pixel circuits 2 in one row via the reset signal line 14.

The selection transistor drive circuit 40*c* is connected to the passive circuit unit 7 via a transfer signal line 15. A gate of the selection transistor Tr4 of each pixel circuit 2 is connected to the selection signal line 15. That is, a row transfer signal SEL to be commonly applied is supplied from the selection transistor drive circuit 40*c* to the gates of the selection transistors Tr4 of the pixel circuits 2 in one row via the selection signal line 15. Note that, in the present embodiment, the transfer signal line 13, the reset signal line 14, and the selection signal line 15 may be simply referred to as signal lines 13, 14, and 15.

The signal generation circuit 16 generates a clock required for an operation of each unit, a pulse signal at a predetermined timing, and an address signal to be supplied to each signal line. The address signal generated in the signal generation circuit 16 is input to the transfer transistor drive circuit 40*a*, the reset transistor drive circuit 40*b*, and the selection transistor drive circuit 40*c* of the drive circuit unit 4 via a decoder (not illustrated) or the like. The pulse signal to be input to the transfer transistor drive circuit 40*a* is referred to as a row transfer signal TRG, the pulse signal to be input to the reset transistor drive circuit 40*b* is referred to as a row reset signal RST, and the pulse signal to be input to the selection transistor drive circuit 40*c* is referred to as a row selection signal SEL. Note that, in the present embodiment, the row transfer signal TRG may be referred to as a signal TRG, the row reset signal RST may be referred to as a signal RST, and the row selection signal SEL may be referred to as a signal SEL.

In the solid-state imaging element 200 according to the present embodiment, analog-to-digital conversion is performed on the signals of the pixel circuits 2 in each row by each analog-to-digital converter 9, and the signals are read to the horizontal transfer line 10 via the sequentially selected row selection circuits SW and are sequentially horizontally transferred. The image data read to the horizontal transfer line 10 is output from the output buffer 12 via the signal processing circuit 11.

[Operation of Solid-State Imaging Device]

A general operation of the pixel circuit 2 will be described. First, the gate of the transfer transistor Tr1 and the gate of the reset transistor Tr2 are turned on to empty all the charges of the photodiode PD. Next, the gate of the transfer transistor Tr1 and the gate of the reset transistor Tr2 are turned off to perform charge accumulation. Next, immediately before the charges of the photodiode PD are read, the gate of the reset transistor Tr2 is turned on to reset the potential of the floating diffusion (FD) region. Thereafter, the gate of the reset transistor Tr2 is turned off, the gate of the transfer transistor Tr1 is turned on, and the charges from the photodiode PD are transferred to the floating diffusion (FD) region. In a case where the charges are applied to the gate of the amplification transistor Tr3, signal charges are electrically amplified. On the other hand, the selection transistor Tr4 is turned on only for the pixel to be read, and an image signal from the amplification transistor Tr3 in the corresponding pixel is read to the vertical signal line 8, the image signal being obtained by performing charge-to-potential conversion.

Figure 3:
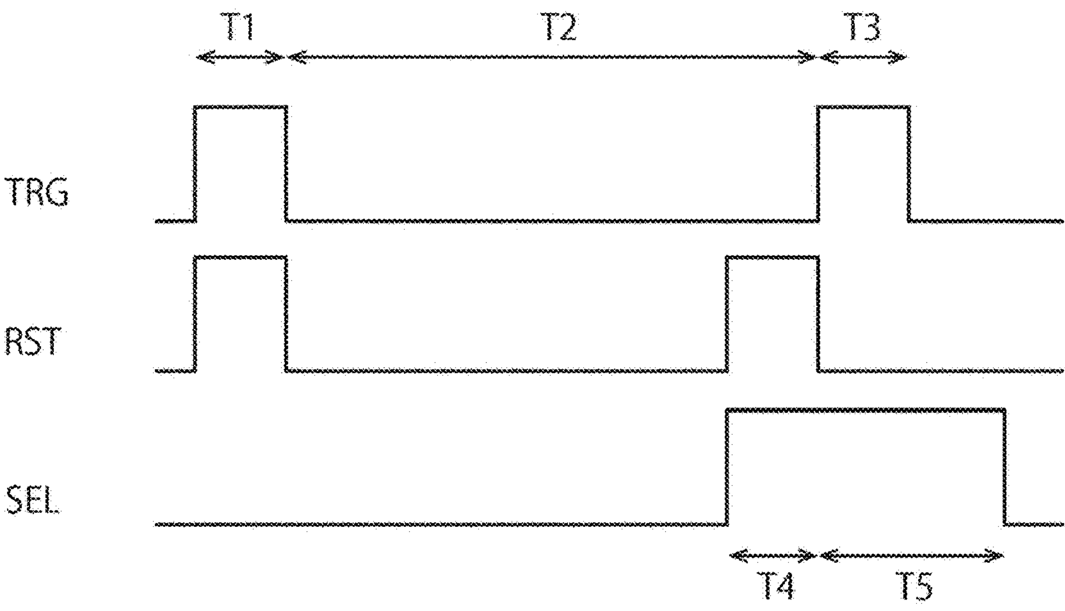
FIG. 3 is a diagram illustrating an example of operation timings when reading signal charges.

In this way, the transfer transistor Tr1, the reset transistor Tr2, and the selection transistor Tr4 are turned on/off by the row transfer signal TRG, the row reset signal RST, and the row selection signal SEL supplied from the drive circuit unit 4. FIG. 3 is a diagram illustrating an example of operation timings when reading the signal charges. As illustrated in FIG. 3, in a period T1, the charges of the photodiode PD are emptied, and in a period T2, charge accumulation is performed. Then, in a period T4 which is the latter half of the period T2, the potential of the floating diffusion region FD is reset, and the reset potential of the floating diffusion region FD is read as a reset level. Thereafter, in a period T3, the signal charges accumulated in the photodiode PD are transferred to the floating diffusion region FD, and in a period T5, the potential of the floating diffusion region FD at this time is read to the vertical signal line 8 as a signal level.

Then, the row transfer signal TRG, the row reset signal RST, and the row selection signal SEL are selectively and sequentially supplied for each row by the address signal output from the signal generation circuit 16, and the signal charges are read to the vertical signal line 8 for each row selected by the supply of the row selection signal SEL.

Figure 4:
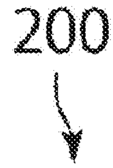
FIG. 4 is a diagram illustrating an example of a stacked structure of a solid-state imaging element according to an embodiment of the present technology.
Figure 4:
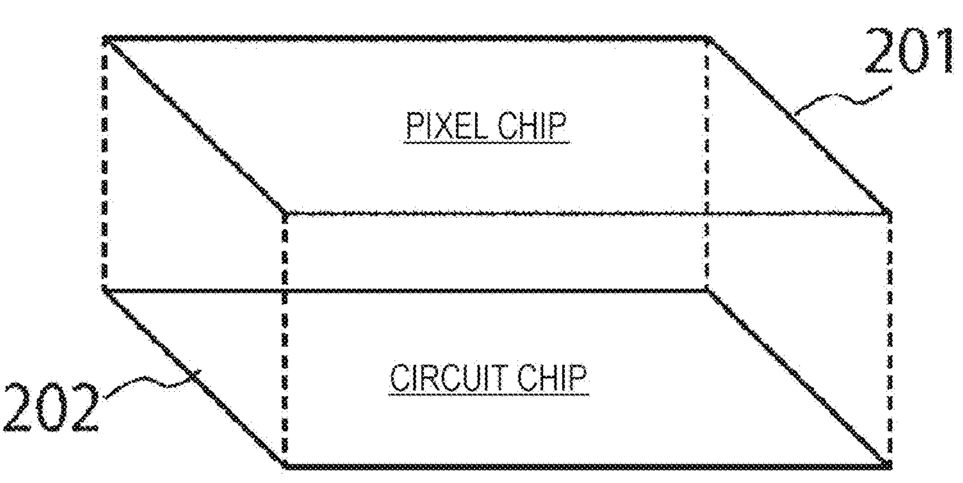

FIG. 4 is a diagram illustrating an example of a stacked structure of the solid-state imaging element 200 according to the embodiment of the present technology. The solid-state imaging element 200 illustrated in FIG. 2 includes a pixel chip (pixel CHIP) 201 and a circuit chip (circuit CHIP) 202 stacked on the pixel chip 201.

[Configuration Example of Pixel Chip]

Figure 5:
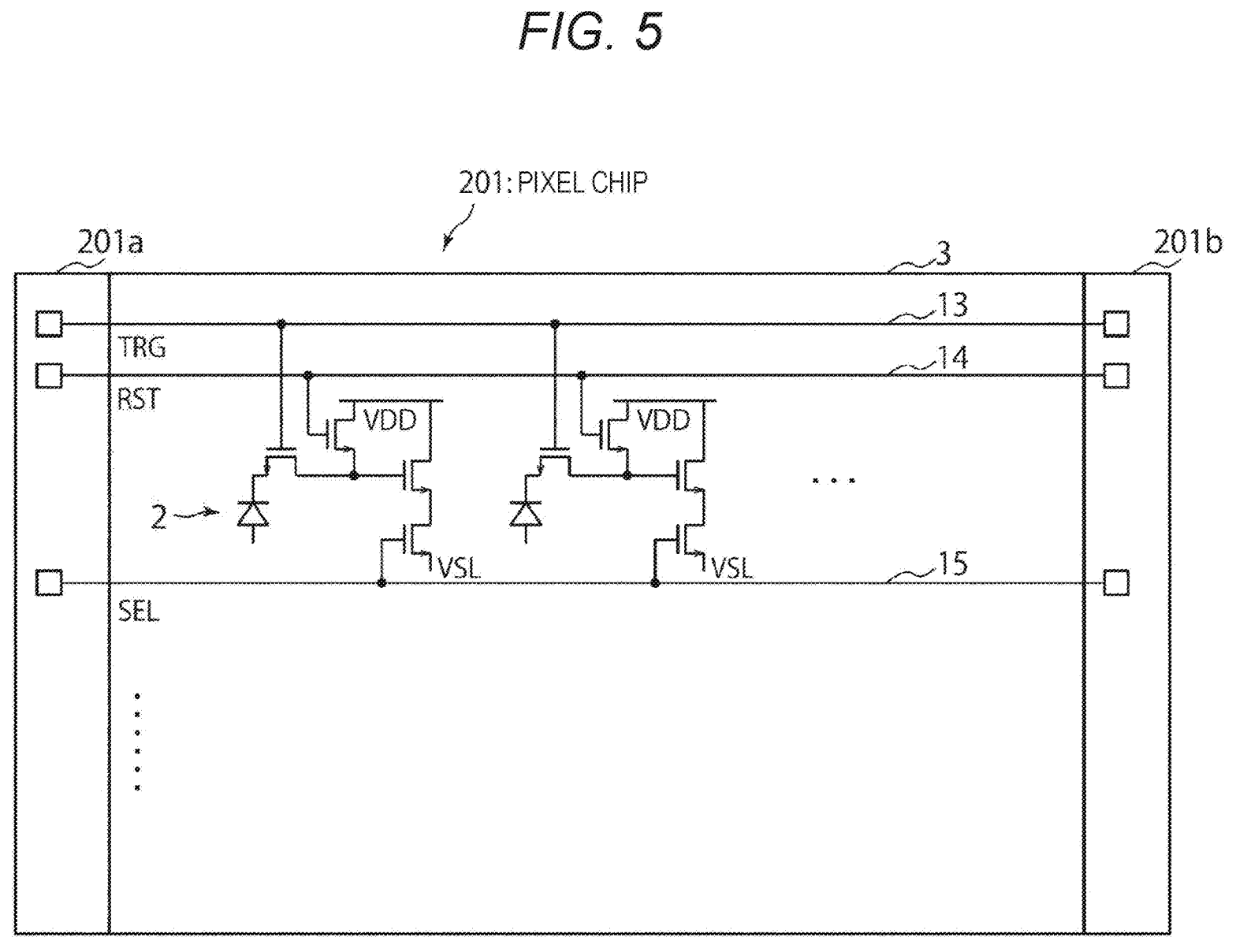

FIG. 5 is a plan view illustrating a configuration example of the pixel chip 201 according to the embodiment of the present technology. The pixel chip 201 includes the imaging unit 3 and connection units 201*a* and 201*b*. As described above, in the imaging unit 3, the plurality of pixel circuits 2 is provided in a two-dimensional lattice pattern. The connection units 201*a* and 201*b* are provided at both ends of the imaging unit 3. In the connection unit 201*a*, terminals of the signal lines 13 to 15 for each row on the passive circuit unit 7 side are provided. On the other hand, in the connection unit 201*b*, terminals of the signal lines 13 to 15 for each row on the drive circuit unit 4 side are provided. The connection units 201*a* and 201*b* may be connection vias such as through silicon vias (TSVs), or may be direct bonding between metals, for example, Cu—Cu bonding.

[Configuration Example of Circuit Chip]

Figure 6:
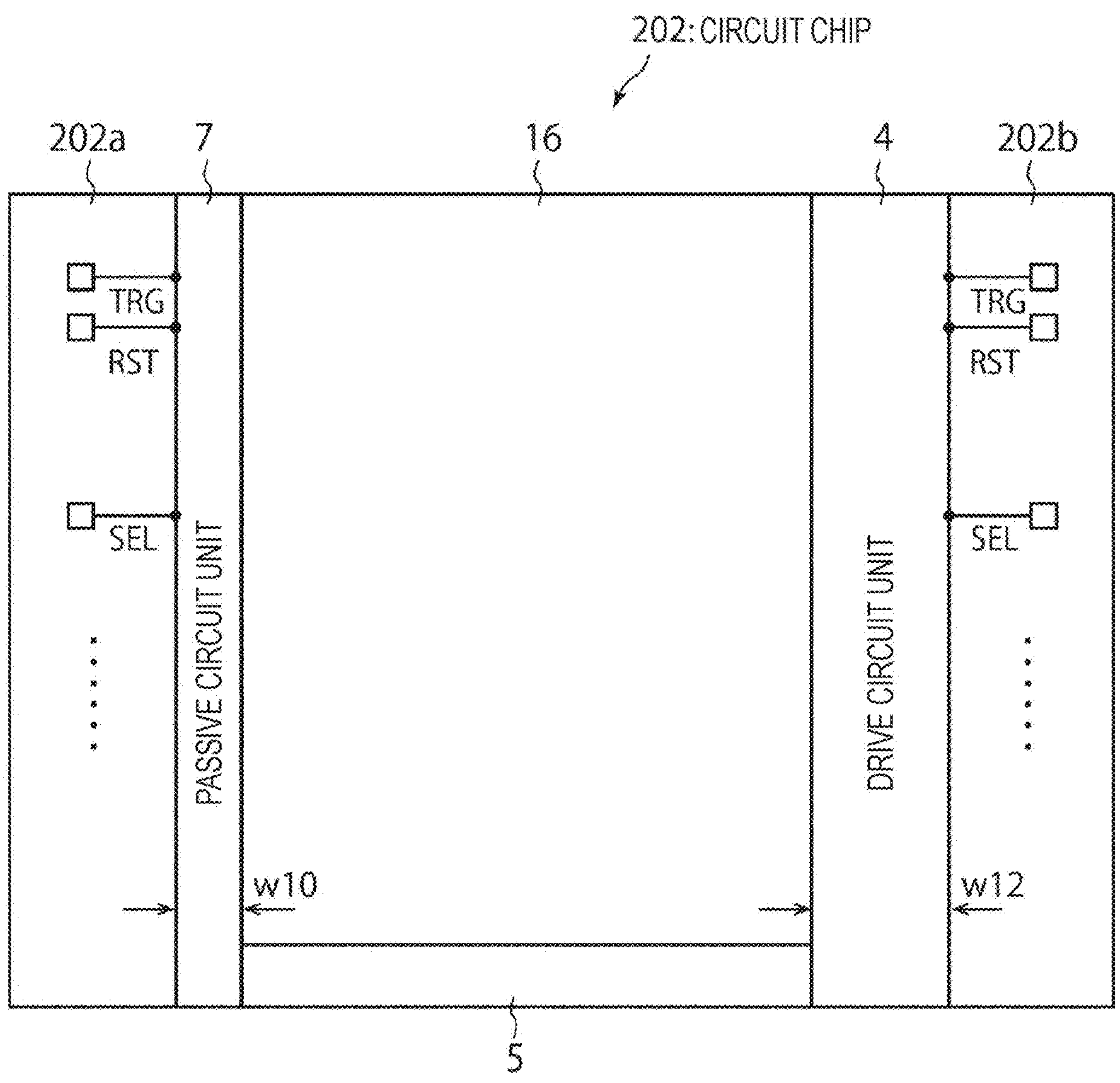
FIG. 6 is a plan view illustrating a configuration example of a circuit chip according to the present embodiment.

FIG. 6 is a plan view illustrating a configuration example of the circuit chip 202 according to the present embodiment. The circuit chip 202 includes the drive circuit unit 4, the readout circuit unit 5, the passive circuit unit 7, the signal processing unit 16, and connection units 202*a* and 202*b*. The corresponding terminal of the connection unit 201*a* is connected to the connection unit 202*a* by a signal line. On the other hand, the corresponding terminal of the connection unit 201*b* is connected to the connection unit 202*b* by a signal line.

As illustrated in FIG. 6, the configuration of the passive circuit unit 7 is simpler than the configuration of the drive circuit unit 4. Therefore, a width W10 of the passive circuit unit 7 in the row direction is narrower than a width W12 of the drive circuit unit 4 in the row direction. For example, so-called both-side drive is generally known in order to maintain a shape of the pulse signal. In this both-side drive, the drive circuit unit 4 is provided on one end side of the circuit chip 202, and the drive circuit unit corresponding to the drive circuit unit 4 is provided on the other end side of the circuit chip 202. In this case, since a width of the drive circuit unit corresponding to the drive circuit unit 4 corresponds to the width W12, a width of the imaging unit 3 of the solid-state imaging element 200 in the row direction becomes wider. On the other hand, on one end side of the solid-state imaging element 200 according to the present embodiment, the passive circuit unit 7 having the width W10 narrower than the width W12 is provided. Therefore, the width of the imaging unit 3 of the solid-state imaging element 200 in the row direction can be further narrowed.

Figure 7:
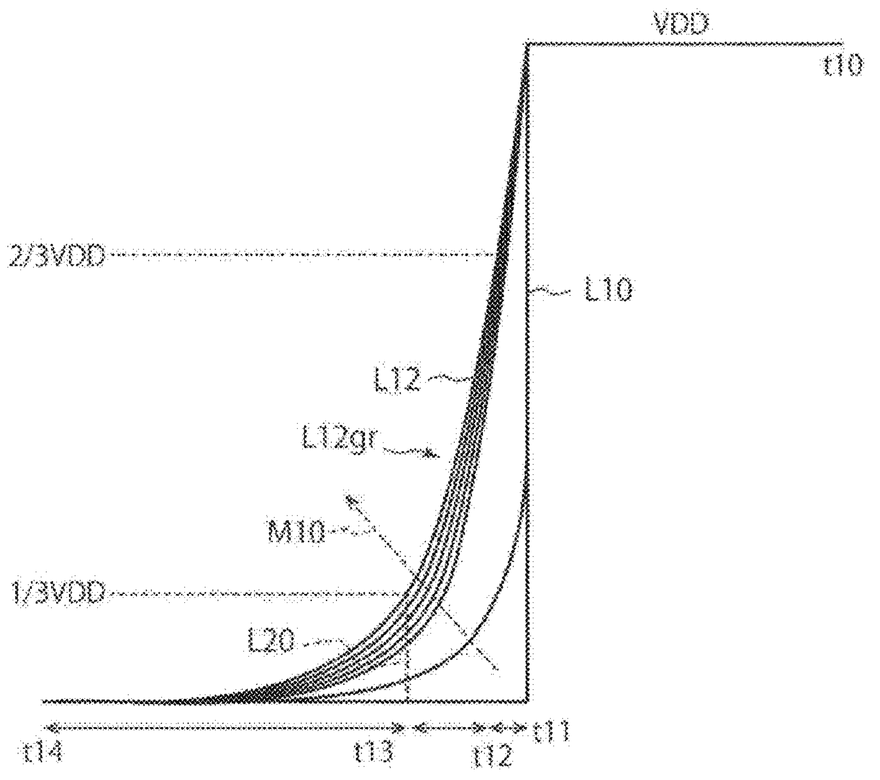
FIG. 7 is a diagram illustrating an example of a pulse signal that changes from a high level to a low level.
Figure 9:
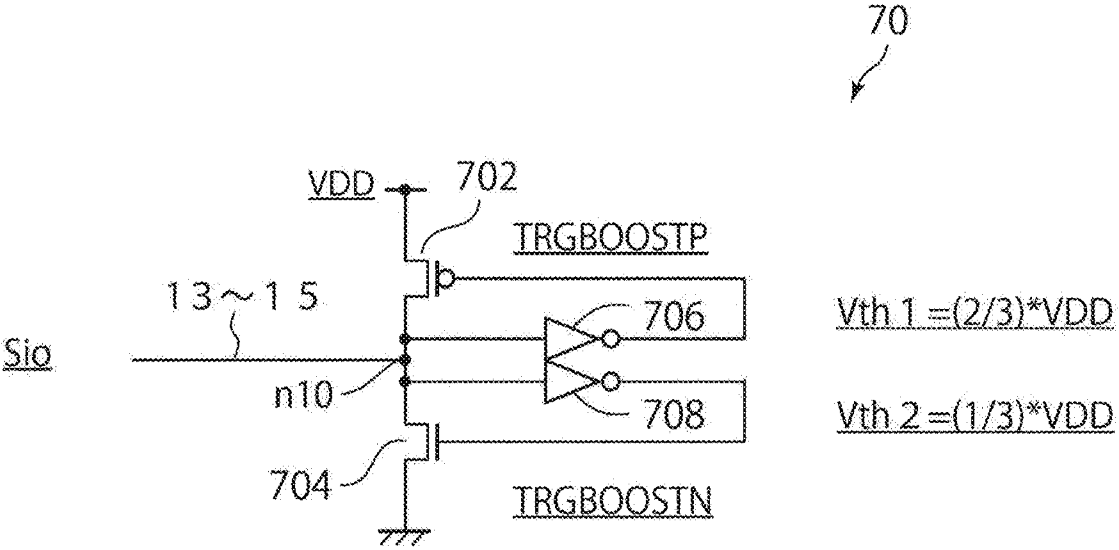
FIG. 9 is a diagram illustrating a configuration example of a passive circuit.
Figure 10:
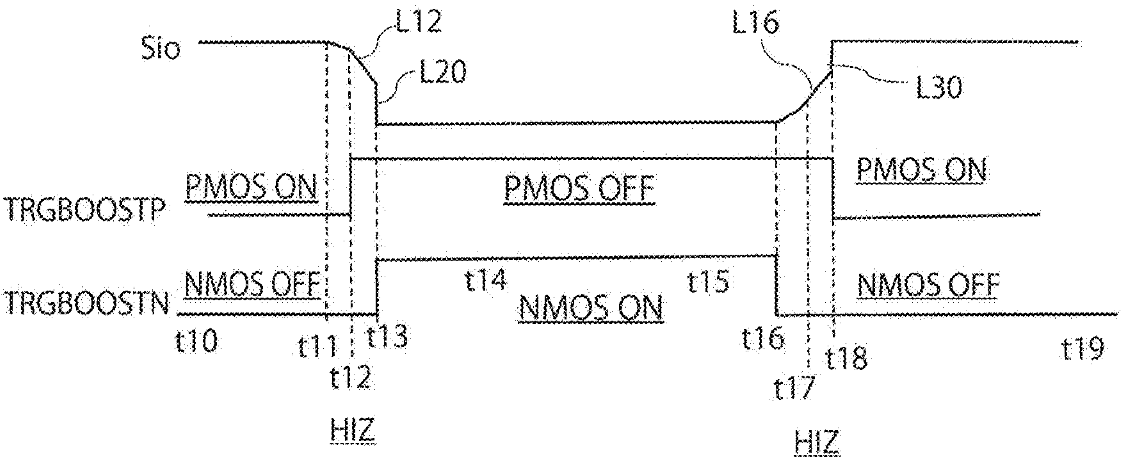
FIG. 10 is a time chart illustrating an operation example of the passive circuit.

Here, an example of a change of the pulse signal in a case where the passive circuit unit 7 is not driven will be described with reference to FIG. 7 and FIG. 8. FIG. 7 is a diagram illustrating an example of the pulse signal that changes from a high level to a low level. The high level is, for example, a power supply wiring potential VDD, and the low level is, for example, a ground potential, for example, 0 volt. A horizontal axis represents time, and a vertical axis represents a signal level. For example, a pulse signal L10 is an example of a signal output from the drive circuit unit 4. The pulse signal L10 is at a high level from a timing t10 to a timing t11, and becomes at a low level at the timing t11. Then, the pulse signal L10 is at a low level from a timing t11 to a timing t14. Note that a line L20 is a line indicating an improvement example in a case where a passive circuit 70 to be described later with reference to FIG. 9 and FIG. 10 is used.

A signal group L12*gr* schematically indicates a change of the pulse signal L10 toward a terminal end side of the signal line in a case where the passive circuit unit 7 is not driven. In the signal group L12*gr*, as indicated by an arrow M10, a rectangular signal changes more gradually toward the terminal end sides of the signal lines 13 to 15, and a time until the signal becomes a low level is lengthened. A signal L12 indicates an example of a pulse signal L10 measured on the terminal end sides of the signal lines 13 to 15.

This is due to an influence of resistance and capacitance of the pixel circuit 2 connected to the signal lines 13 to 15. For example, the signal L12 on the terminal end sides of the signal lines 13 to 15 becomes ⅔ VDD at a timing t12, and becomes ⅓ VDD at a timing t13. It takes a time until a timing t14 for the signal L12 to reach 0 volt. As described above, in the signal group L12*gr*, the signal level relatively steeply decreases up to the potential of ⅓ VDD, and the signal level gradually decreases from ⅓ VDD to 0 volt. For example, in the signal L12, in a case where the passive circuit unit 7 is not driven, it takes a time of t14−t11 until the signal level becomes a low level at a terminal end portion. In other words, it is indicated that a signal processing time for one row is delayed by a time of t14−t11. This causes a decrease in a frame rate of image capturing of the solid-state imaging element 200. Note that ⅔ VDD according to the present embodiment corresponds to a first predetermined value and ⅓ VDD corresponds to a second predetermined value.

Figure 8:
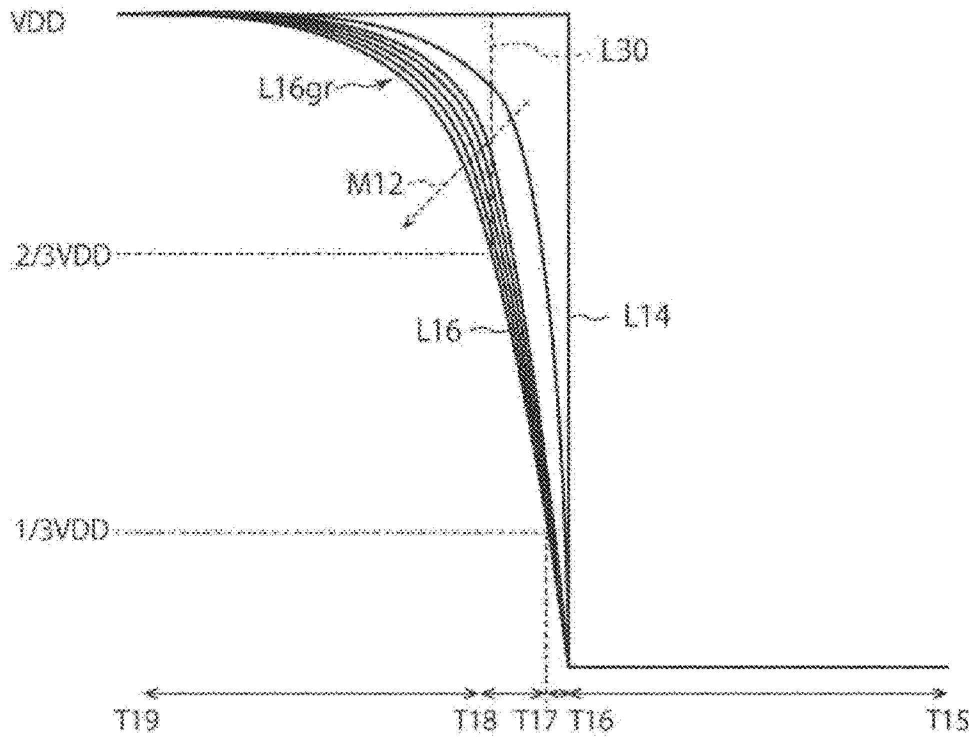
FIG. 8 is a diagram illustrating an example of a pulse signal that changes from a low level to a high level.

FIG. 8 is a diagram illustrating an example of the pulse signal that changes from a low level to a high level. The high level is, for example, a power supply wiring potential VDD, and the low level is, for example, a ground potential, for example, 0 volt. A horizontal axis represents time, and a vertical axis represents a signal level. For example, a pulse signal L14 is an example of a signal output from the drive circuit unit 4. The pulse signal L14 is at a low level from a timing t15 to a timing t16, and becomes at a high level at the timing t16. Then, the pulse signal L14 is at a high level from the timing t16 to a timing t19. Note that a line L30 is a line indicating an improvement example in a case where a passive circuit 70 to be described later with reference to FIG. 9 and FIG. 10 is used.

A signal group L16*gr* schematically indicates a change of the pulse signal L14 toward a terminal end side of the signal line in a case where the passive circuit unit 7 is not driven. In the signal group L16*gr*, as indicated by an arrow M12, a rectangular signal changes more gradually toward the terminal end sides of the signal lines, and a time until the signal becomes a high level is lengthened. A signal L16 indicates an example of a pulse signal L14 measured on the terminal end sides of the signal lines.

This is due to an influence of resistance and capacitance of the pixel circuit 2 connected to the signal lines 13 to 15. For example, the signal L16 on the terminal end sides of the signal lines 13 to 15 becomes ⅓ VDD at a timing t17, and becomes ⅔ VDD at a timing t18. It takes a time until a timing t19 for the signal L16 to reach the potential VDD. As described above, in the signal group L16*gr*, the signal level relatively steeply increases up to the potential of ⅔ VDD, and the signal level gradually increases from ⅔ VDD to a VDD volt. For example, in the signal L16, in a case where the passive circuit unit 7 is not driven, it takes a time of t19−t16 until the signal level becomes a high level at a terminal end portion. In other words, it is indicated that a signal processing time for one row is delayed by a time of t19−t16. This causes a decrease in a frame rate of image capturing of the solid-state imaging element 200.

An example of the passive circuit for improving such a delay will be described with reference to FIG. 9 and FIG. 10. FIG. 9 is a diagram illustrating a configuration example of the passive circuit 70. As illustrated in FIG. 9, the passive circuit 70 includes a PMOS transistor 702, an NMOS transistor 704, a first inverter 706, and a second inverter 708. One end of the PMOS transistor 702 is connected to a power supply line (potential VDD), and the other end of the PMOS transistor 702 is connected to a node n10. One end of the NMOS transistor 704 is connected to the node n10, and the other end of the NMOS transistor 704 is connected to the ground (ground) potential. Furthermore, any one of the signal lines 13 to 15 is connected to the node n10, and a signal Sio is supplied from the drive circuit unit 4. That is, the signal Sio is an example of a signal at terminal end portions of the signal lines 13 to 15. Note that the PMOS transistor 702 according to the present embodiment corresponds to a first switching element and the NMOS transistor 704 according to the present embodiment corresponds to a second switching element. Furthermore, the first inverter 706 and the second inverter 708 correspond to drive elements.

The first inverter 706 has an input terminal connected to the node n10 and an output terminal connected to a gate of the PMOS transistor 702. That is, an output signal TRGBOOSTP of the first inverter 706 is supplied to the gate of the PMOS transistor 702. A threshold potential Vth1 of the first inverter 706 is, for example, ⅔ VDD. Note that the threshold potential Vth1 according to the present embodiment is ⅔ VDD. On the other hand, the threshold potential Vth1 is not limited thereto.

The second inverter 708 has an input terminal connected to the node n10 and an output terminal connected to a gate of the NMOS transistor 704. That is, an output signal TRGBOOSTN of the second inverter 7086 is supplied to the gate of the NMOS transistor 704. A threshold potential Vth2 of the second inverter 708 is, for example, ⅓ VDD. Note that the threshold potential Vth2 according to the present embodiment is ⅓ VDD. On the other hand, the threshold potential Vth2 is not limited thereto.

FIG. 10 is a time chart illustrating an operation example of the passive circuit 70. The signals Sio, TRGBOOST, and TRGBOOSTN (refer to FIG. 9) are illustrated from the top. In each signal, a vertical axis is a signal level, and a horizontal axis is time. The signal Sio schematically illustrates, for example, the signal L12 (refer to FIG. 7) and the signal L16 (refer to FIG. 8).

From a timing t10 to a timing t11, the signal Sio is at a high level. From the timing t10 to the timing t11, since the signal Sio does not exceed the threshold potential Vth1 of the first inverter 706, the output signal TRGBOOSTP is at a low level, and the PMOS transistor 702 is in a conductive state (ON). Similarly, since the signal Sio does not exceed the threshold potential Vth2 of the second inverter 708, the output signal TRGBOOSN is at a low level, and the NMOS transistor 704 is in a non-conductive state (OFF).

The signal level of the signal Sio starts to decrease at the timing t11. Then, at a timing t12, the signal Sio becomes ⅔ VDD. When the signal Sio becomes ⅔ VDD at the timing t12, the signal Sio exceeds the threshold potential Vth1 of the first inverter 706, and thus the output signal TRGBOOSTP is inverted from a low level to a high level. Therefore, the PMOS transistor 702 enters into a non-conductive state (OFF). On the other hand, since the signal Sio does not exceed the threshold potential Vth2 of the second inverter 708, the output signal TRGBOOSN is at a low level, and the NMOS transistor 704 is in a non-conductive state (OFF). Therefore, in the passive circuit 70, the node n10 is in a high impedance state (HIZ). Note that, by providing a high impedance section, it is possible to reduce a deterioration of a falling time or a rising time that is caused by the passive circuit unit 4. Furthermore, by providing a high impedance period, it is possible to prevent, for example, short circuit between the VDD potential and the ground potential.

The signal level of the signal Sio further decreases, and becomes ⅓ VDD at a timing t13. The output signal TRGBOOSTP maintains the high level. On the other hand, the signal Sio exceeds the threshold potential Vth2 of the second inverter 708, and thus the output signal TRGBOOSTN is inverted from a low level to a high level at the timing t13. Therefore, the NMOS transistor 704 enters into a conductive state (ON). As a result, the node n10 of the passive circuit 70 becomes a low level at the timing t13.

Referring to FIG. 7 again, since the node n10 is at a low level at the timing t13, the potential of the node n10 is changed from the potential along the signal L12 to a low level along the signal L20. Therefore, the potential of the terminal end portions of the signal lines 13 to 15 becomes a low level at the timing t13, and thus a signal processing time for one row is shortened by a time of t14–t13. That is, a time for changing the signal for one row from a high level to a low level is shortened by a time of t14–t13.

Referring to FIG. 10 again, the signal level of the signal Sio starts to increase at a timing t16. Then, the signal Sio becomes ⅓ VDD at a timing t17. When the signal Sio becomes ⅓ VDD at the timing t17, the signal Sio exceeds the threshold potential Vth2 of the second inverter 708, and thus the output signal TRGBOOSTN is inverted from a high level to a low level. Therefore, the NMOS transistor 704 enters into a non-conductive state (OFF). On the other hand, since the signal Sio does not exceed the threshold potential Vth1 of the first inverter 706, the output signal TRGBOOSP is at a high level, and the PMOS transistor 702 is in a non-conductive state (OFF). Therefore, in the passive circuit 70, the node n10 is in a high impedance state (HIZ).

The signal level of the signal Sio further increases, and becomes ⅔ VDD at a timing t18. The signal Sio exceeds the threshold potential Vth1 of the first inverter 706, and thus the output signal TRGBOOSTP becomes a low level from a high level. Therefore, the NMOS transistor 704 enters into a conductive state (ON). On the other hand, the NMOS transistor 704 maintains a non-conductive state (OFF). As a result, the node n10 of the passive circuit 70 becomes a high level at the timing t18.

Referring to FIG. 8 again, since the node n10 is at a high level at the timing t18, the potential of the node n10 is changed from the potential along the signal L16 to a high level along the signal L30. Therefore, the potential of the terminal end portions of the signal lines 13 to 15 becomes a high level at the timing t18, and thus a signal processing time for one row is shortened by a time of t19–t18. That is, a time for changing the signal for one row from a low level to a high level is shortened by a time of t19–t18.

As described above, according to the present embodiment, the passive circuit 70 is disposed at the terminal end of each of the signal lines 13 to 15 of the pixel circuit 2. When receiving a signal corresponding to an intermediate-level signal between a high-level signal and a low-level signal, the passive circuit 70 supplies a potential corresponding to the high-level signal or the low-level signal to the terminal end of each of the signal lines 13 to 15 according to the received signal level. Therefore, even in a case where the shape of the pulse signal to be supplied to the signal lines 13 to 15 spreads in, for example, a trapezoidal shape, a change time of the signal level of the signal lines 13 to 15 can be shortened. As a result, it is possible to prevent a decrease in the frame rate of image capturing of the solid-state imaging element 200.

Furthermore, the width w10 of the passive circuit unit 7 including the plurality of passive circuits 70 in the row direction can be narrower than the width w12 of the drive circuit unit 4 in the row direction. Therefore, the solid-state imaging element 200 can be downsized as compared with a so-called double-reading drive in which the drive circuit unit 4 is disposed at both ends of the solid-state imaging element 200.

Modification Example of First Embodiment

A passive circuit 70*a* of an electronic device 100 according to a modification example of the first embodiment is different from the passive circuit 70 according to the first embodiment in that setting of the threshold potential is changed between a case where a high level signal is changed to a low level signal and a case where a low level signal is changed to a high level signal. In the following description, differences from the passive circuit 70 according to the first embodiment will be described.

Figure 11:
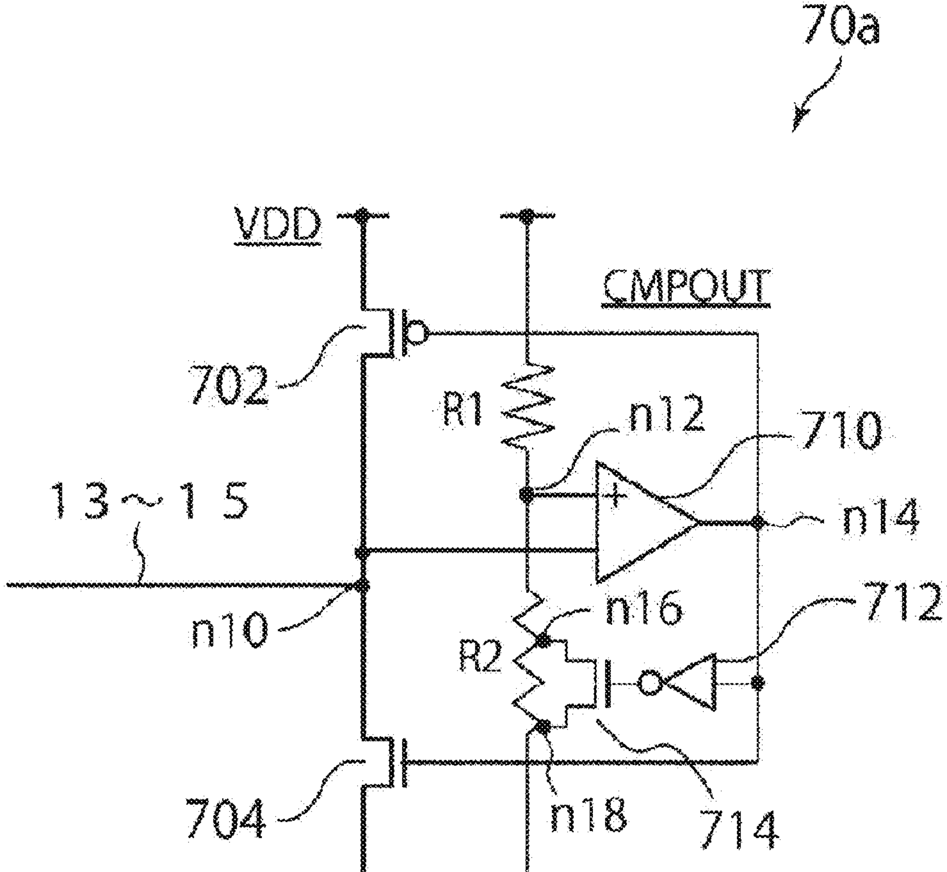
FIG. 11 is a diagram illustrating a configuration example of another passive circuit.

FIG. 11 is a diagram illustrating a configuration example of the passive circuit 70. As illustrated in FIG. 11, the passive circuit 70 includes a PMOS transistor 702, an NMOS transistor 704, a comparator 710, a third inverter 712, an NMOS transistor 714, a resistor R1, and a resistor R2. One end of the PMOS transistor 702 is connected to a power supply line (potential VDD), and the other end of the PMOS transistor 702 is connected to a node n10. One end of the NMOS transistor 704 is connected to the node n10, and the other end of the NMOS transistor 704 is connected to the ground (ground) potential. Furthermore, any one of the signal lines 13 to 15 is connected to the node n10, and a signal Sio is supplied from the drive circuit unit 4. That is, the signal Sio is an example of a signal at terminal end portions of the signal lines 13 to 15. Note that the comparator 710, the third inverter 712, the NMOS transistor 714, the resistor R1, and the resistor R2 according to the present embodiment correspond to drive elements. Further, the resistor R1 corresponds to a first resistor, and the resistor R2 corresponds to a second resistor.

In the comparator 710, an inversion terminal is connected to a node n10, a non-inversion terminal is connected to a node n12, and an output terminal is connected to a node n14. The node n14 is connected to gates of the PMOS transistor 702 and the NMOS transistor 704, and an input terminal of the third inverter 712. That is, an output signal CMPOUT of the comparator 710 is supplied to the gates of the PMOS transistor 702 and the NMOS transistor 704, and the input terminal of the third inverter 712.

One end of the resistor R1 is connected to a power supply line (potential VDD), and the other end of the resistor R1 is connected to a node n12. One end of the resistor R2 is connected to the node n12, and the other end of the resistor R2 is connected to the ground potential. The resistor R2 includes a resistor Ra between the nodes n16 and n18 and a resistor Rb between the nodes n12 and n16.

One end of the NMOS transistor 714 is connected to the node n16, and the other end of the NMOS transistor 714 is connected to the node n18. The output terminal of the input terminal of the third inverter 712 is connected to a gate of the PMOS transistor 714.

With such a configuration, the resistor R2 becomes the resistor Rb when the NMOS transistor 714 enters into a conductive state, and the resistor R2 becomes the resistor Ra+Rb when the PMOS transistor 714 is in a non-conductive state. Therefore, the potential of the node n12 becomes REF1=VDD*Rb/(R1+Rb)=VDD*⅓ when the NMOS transistor 714 is in a conductive state, and becomes REF2=VDD*(R2=Ra+Rb)/(R1+R2)=VDD*⅔ when the NMOS transistor is in a non-conductive state.

Figure 12:
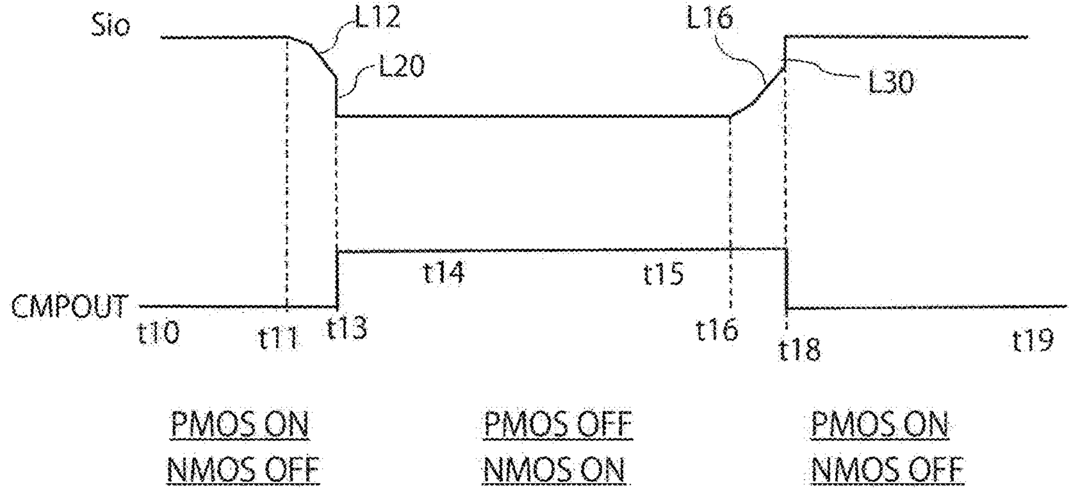
FIG. 12 is a time chart illustrating an operation example of another passive circuit.

FIG. 12 is a time chart illustrating an operation example of the passive circuit 70*a*. The signals Sio and CMPOUT (refer to FIG. 11) are illustrated from the top. In each signal, a vertical axis is a signal level, and a horizontal axis is time. The signal Sio schematically illustrates, for example, the signal L12 (refer to FIG. 7) and the signal L16 (refer to FIG. 8).

From a timing t10 to a timing t11, the signal Sio is at a high level. From the timing t10 to the timing t11, since the potential of the node n10 is higher than the potential of the node n12, CMPOUT is a low level signal. Therefore, the PMOS transistor 702 enters into a conducting state (ON), and the NMOS transistor 704 is in a non-conducting state (OFF). At this time, since the NMOS transistor 714 enters into a conductive state, the potential of the node n12 is REF1=VDD*Rb/(R1+Rb)=VDD*⅓.

The signal level of the signal Sio starts to decrease at the timing t11. Then, the signal Sio becomes ⅓ VDD at a timing t13. When the signal level of the signal Sio is lower than ⅓ VDD at the timing t13, CMPOUT changes from a low level signal to a high level signal. At this time, the PMOS transistor 702 enters into a non-conductive state (OFF), the NMOS transistor 704 enters into a conductive state (ON), and the NMOS transistor 714 enters into a non-conductive state (OFF).

Referring to FIG. 7 again, since the node n10 is at a low level at the timing t13, the potential of the node n10 is changed from the potential along the signal L12 to a low level along the signal L20. Therefore, the potential of the terminal end portions of the signal lines 13 to 15 becomes a low level at the timing t13, and thus a signal processing time for one row is shortened by a time of t14–t13. That is, a time for changing the signal for one row from a high level to a low level is shortened by a time of t14–t13. Note that, at this time, since the NMOS transistor 714 is in a non-conductive state, the potential of the node n12 becomes REF2=VDD*(R2=Ra+Rb)/(R1+R2)=VDD*⅔ and thus CMPOUT maintains the high level signal.

Referring to FIG. 12 again, the signal level of the signal Sio starts to increase at a timing t16. Then, the signal Sio becomes ⅔ VDD or higher at a timing t18. When the signal level of the signal Sio becomes ⅔ VDD or higher at the timing t18, CMPOUT changes from a high level signal to a low level signal. At this time, the PMOS transistor 702 enters into a conductive state (ON), the NMOS transistor 704 enters into a non-conductive state (OFF), and the NMOS transistor 714 enters into a conductive state (ON).

Referring to FIG. 8 again, since the node n10 is at a high level at the timing t18, the potential of the node n10 is changed from the potential along the signal L16 to a high level along the signal L30. Therefore, the potential of the terminal end portions of the signal lines 13 to 15 becomes a high level at the timing t18, and thus a signal processing time for one row is shortened by a time of t19–t18. That is, a time for changing the signal for one row from a low level to a high level is shortened by a time of t19–t18. At this time, since the NMOS transistor 714 is in a conductive state (ON), the potential of the node n12 becomes REF1=VDD*Rb/(R1+Rb)=VDD*⅓, and thus CMPOUT maintains a low level signal.

In this manner, the passive circuit 70*a* connects the NMOS transistor 714 to the node n16 and the node n18 of the resistor R2. Therefore, the potential of the non-inversion input terminal of the comparator 710 can be changed between a case where a high level signal is changed to a low level signal and a case where a low level signal is changed to a high level signal. Thus, it is possible to change the signal level of the signal Sio in a case where the output signal CMPOUT of the comparator 710 changes from a high level signal to a low level signal and in a case where the output signal CMPOUT of the comparator 710 changes from a low level signal to a high level signal. As a result, ON/OFF switching potentials of the PMOS transistor 702 and the NMOS transistor 704 can be changed between a case where the signal Sio changes from a high level signal to a low level signal and a case where the signal Sio changes from a low level signal to a high level signal.

Furthermore, in the passive circuit 70*a*, an HIZ section (refer to FIG. 10) is eliminated, and the passive element (the PMOS transistor 714) (refer to FIG. 11) enters into a conductive state (ON) or a non-conductive state (OFF). Thus, the potential of the node n10 can be changed from a high level to a low level or from a low level to a high level in a short time. In addition, since an adjustment range of the threshold is wide and the resistance ratio is used, it is possible to prevent a variation in characteristics. Furthermore, since ranges of the node n16 and the node n18 of the resistor R2 can be continuously changed, the ON/OFF switching potentials of the MOS transistor 702 and the NMOS transistor 704 can be continuously changed. Furthermore, by connecting the node n14 to the gates of the PMOS transistor 702 and the NMOS transistor 704, ON/OFF switching of the MOS transistor 702 and the NMOS transistor 704 can be performed without providing a high impedance period.

Second Embodiment

The electronic device 100 according to a second embodiment is different from the electronic device 100 according to the first embodiment in that characteristics of the passive circuits connected to the signal lines 13 to 15 are changed by capacitance and resistance connected to the signal lines 13 to 15. In the following description, differences from the electronic device 100 according to the first embodiment will be described.

Figure 13:
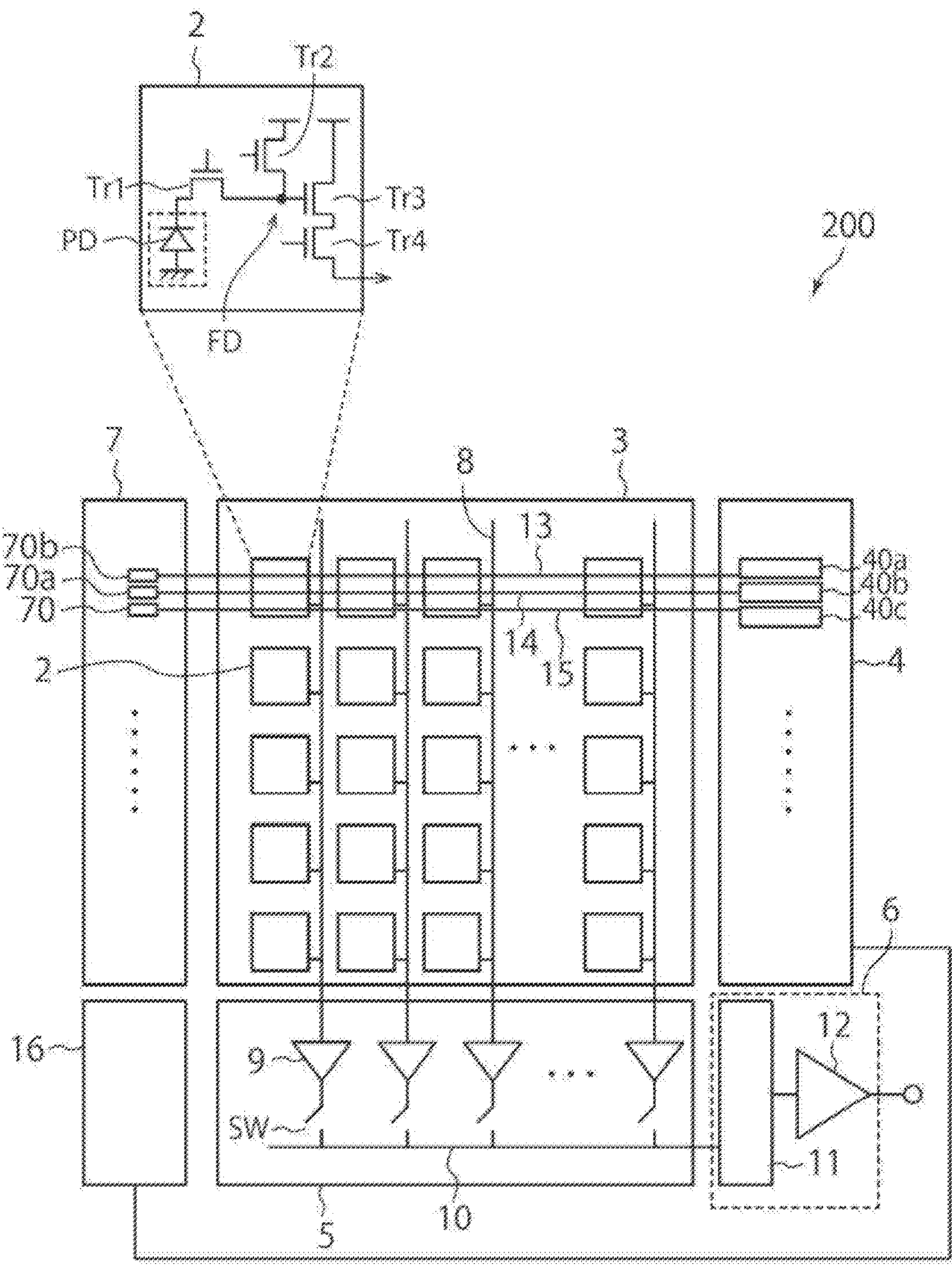
FIG. 13 is a diagram illustrating a schematic configuration of a solid-state imaging device according to a second embodiment.

FIG. 13 is a diagram illustrating a schematic configuration of the solid-state imaging element 200 according to the second embodiment. In FIG. 13, the characteristics of the passive circuits connected to the terminal end portions of the transfer signal line 13, the reset signal line 14, and the transfer signal line 15 are changed. For example, a passive circuit 70*b* to be described below is connected to the transfer signal line 13, a passive circuit 70*a* is connected to the reset signal line 14, and a passive circuit 70 is connected to the transfer signal line 15. Note that a combination of the connections of the passive circuits 70, 70*a*, and 70*b* is an example, and the present embodiment is not limited thereto.

Figure 14:
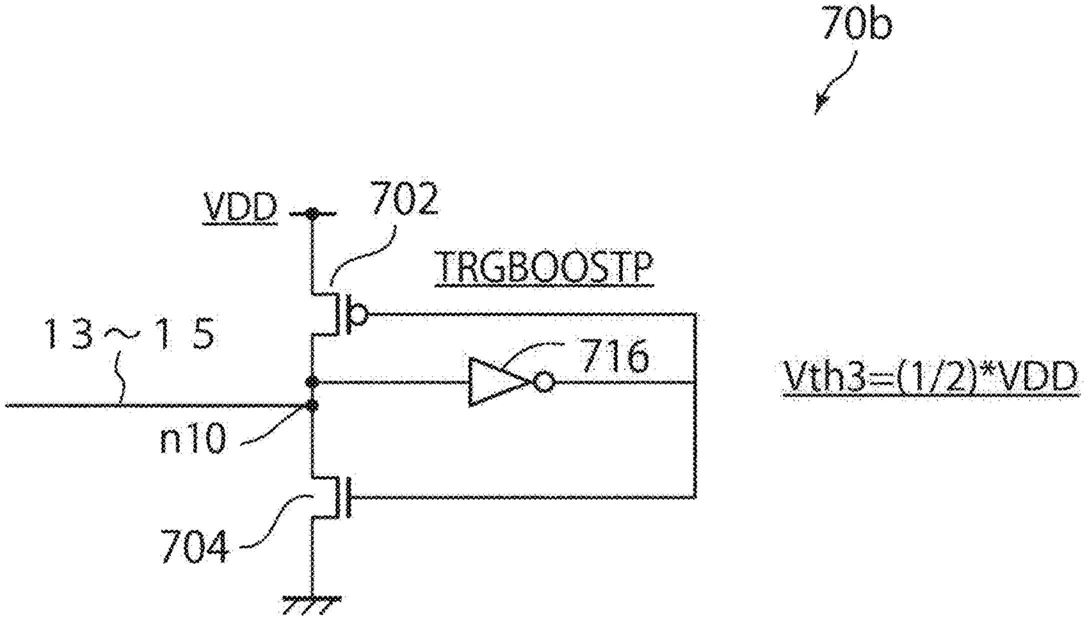
FIG. 14 is a diagram illustrating a configuration example of still another passive circuit.

FIG. 14 is a diagram illustrating a configuration example of the passive circuit 70*b*. As illustrated in FIG. 14, the passive circuit 70*b* includes a PMOS transistor 702, an NMOS transistor 704, and a fourth inverter 716. One end of the PMOS transistor 702 is connected to a power supply line (potential VDD), and the other end of the PMOS transistor 702 is connected to a node n10. One end of the NMOS transistor 704 is connected to the node n10, and the other end of the NMOS transistor 704 is connected to the ground (ground) potential. Furthermore, any one of the signal lines 13 to 15 is connected to the node n10, and a signal Sio is supplied from the drive circuit unit 4. That is, the signal Sio is an example of a signal at terminal end portions of the signal lines 13 to 15. Since there is only one fourth inverter 716, the size can be further reduced. Note that the fourth inverter 716 according to the present embodiment corresponds to a drive element.

The fourth inverter 716 has an input terminal connected to the node n10 and an output terminal connected to gates of the PMOS transistor 702 and the NMOS transistor 704. That is, an output signal TRGBOOST of the fourth inverter 716 is supplied to the gates of the PMOS transistor 702 and the NMOS transistor 704. A threshold potential Vth3 of the fourth inverter 716 is, for example, ½ VDD. Note that the threshold potential Vth3 according to the present embodiment is ½ VDD. On the other hand, the threshold potential Vth3 is not limited thereto. In addition, since a high impedance section is not provided, an effect of shortening a falling time by the passive circuit unit 4 may be suppressed.

Figure 15:
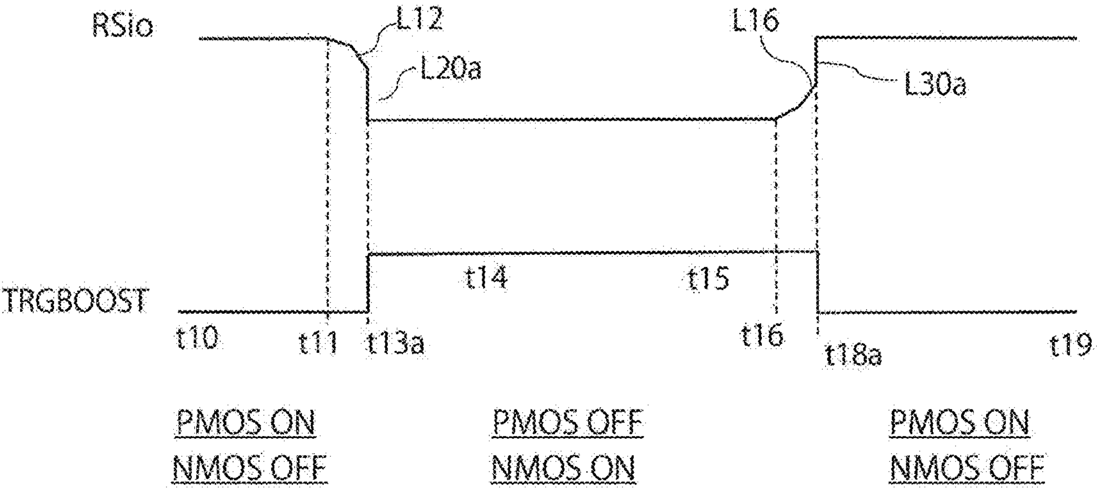
FIG. 15 is a time chart illustrating an operation example of still another passive circuit.

FIG. 15 is a time chart illustrating an operation example of the passive circuit 70*b*. The signals Sio and TRGBOOST (refer to FIG. 14) are illustrated from the top. In each signal, a vertical axis is a signal level, and a horizontal axis is time. The signal Sio schematically illustrates, for example, the signal L12 (refer to FIG. 7) and the signal L16 (refer to FIG. 8). A timing t13*a* is a timing between the timing t12 (refer to FIG. 7) and the timing t13, and is a timing at which the signal Sio becomes ½ VDD. Similarly, a timing t18*a* is a timing between the timing t17 (refer to FIG. 8) and the timing t18, and is a timing at which the signal Sio becomes ½ VDD.

From a timing t10 to a timing t11, the signal Sio is at a high level. From the timing t10 to the timing t11, since the signal Sio does not exceed the threshold potential Vth3 of the fourth inverter 716, the output signal TRGBOOST is at a low level, the PMOS transistor 702 is in a conductive state (ON), and the NMOS transistor 704 is in a non-conductive state (OFF).

The signal level of the signal Sio starts to decrease at the timing t11. Then, the signal Sio becomes ½ VDD at a timing t13*a*. When the signal Sio becomes ½ VDD at the timing t13*a*, the signal Sio exceeds the threshold potential Vth3 of the fourth inverter 716, and thus the output signal TRGBOOST is inverted from a low level to a high level. Therefore, the PMOS transistor 702 enters into a non-conductive state (OFF), and the NMOS transistor 704 enters into a conductive state (ON).

Referring to FIG. 7 again, since the node n10 becomes a low level at the timing t13*a*, a signal processing time for one row is shortened by a time of t14–t13*a*. That is, a time for changing the signal for one row from a high level to a low level is shortened by a time of t14–t13*a*. Note that, in this case, since a high impedance section is not provided, t12 (⅔ VDD) does not exist. Therefore, a section (t12–t13) (refer to FIG. 9) may increase.

Referring to FIG. 15 again, the signal level of the signal Sio starts to increase at a timing t16. Then, the signal Sio becomes ½ VDD at a timing t18*a*. When the signal Sio becomes ½ VDD at the timing t18*a*, the signal Sio exceeds the threshold potential Vth3 of the fourth inverter 716, and thus the output signal TRGBOOST is inverted again from a low level to a high level. Therefore, the NMOS transistor 704 enters into a non-conductive state (OFF), and the PMOS transistor 702 enters into a conductive state (ON). Note that, in this case, since a high impedance section is not provided, t17 (⅓ VDD) does not exist. Therefore, a section (t17–18) (refer to FIG. 9) may increase.

Referring to FIG. 8 again, since the node n10 becomes a high level at the timing t18*a*, a signal processing time for one row is shortened by a time of t19–t18*a*. That is, a time for changing the signal for one row from a low level to a high level is shortened by a time of t19–t18*a*.

Figure 16:
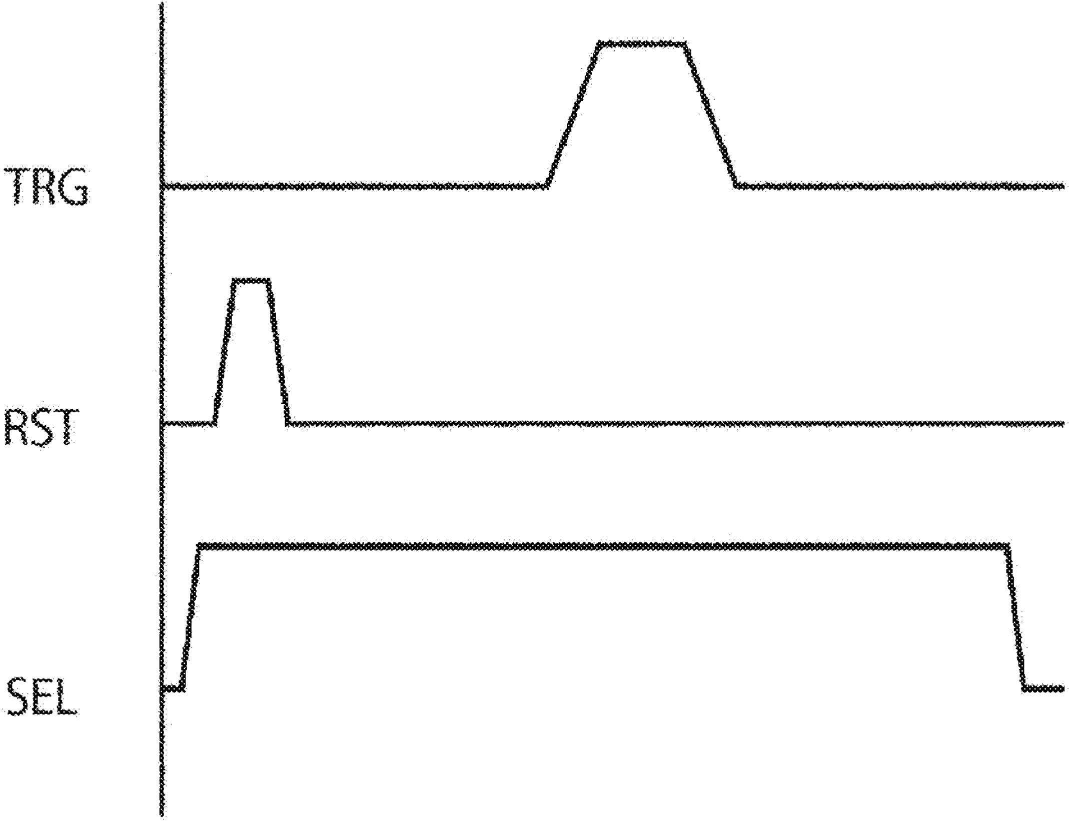
FIG. 16 is a diagram schematically illustrating a signal of a terminal end portion of each signal line.

FIG. 16 is a diagram schematically illustrating the signals TRG, RST, and SEL of the terminal end portions of the signal lines 13 to 15. A vertical axis represents a signal level, and a horizontal axis represents time. The high level of the signals TRG, RST, and SEL is the VDD potential, and the low level of the signals TRG, RST, and SEL is the ground potential.

As illustrated in FIG. 16, a skirt of a rectangular wave of the signal TRG is widest. Therefore, when the signal TRG changes from a high level to a low level, the NMOS transistor 704 enters into a conductive state (ON) at ½ VDD of the signal TRG, and the PMOS transistor 702 enters into a non-conductive state (OFF). Thus, the passive circuit 70*b* is connected to the signal line 13. Therefore, the node n10 of the signal TRG (refer to FIG. 14) can be changed from a high level to a low level in a shorter time. Similarly, in the passive circuit 70*b*, when the signal TRG changes from a low level to a high level, the NMOS transistor 704 enters into a non-conductive state (OFF) at ½ VDD of the signal TRG, and the PMOS transistor 702 enters into a conductive state (ON). Therefore, the node n10 of the signal TRG (refer to FIG. 14) can be changed from a low level to a high level in a shorter time. As described above, by using the passive circuit 70*b*, an influence of spreading of the skirt of the rectangular wave of the signal TRG can be further suppressed.

On the other hand, the passive circuit 70*a* is connected to the signal line 14. As described above, in the passive circuit 70*a*, an HIZ section (refer to FIG. 10) is eliminated, and the passive element (the PMOS transistor 714) (refer to FIG. 11) enters into a conductive state (ON) or a non-conductive state (OFF). Thus, the potential of the node n10 can be changed from a high level to a low level or from a low level to a high level in a short time.

Further, the passive circuit 70 is connected to the signal line 15. The passive circuit 70 has a high impedance period, and thus the high impedance period can be adjusted in accordance with a control state of the signal line 8 connected to the readout circuit unit 5. For example, by using the high impedance period, it possible to suppress excessive response characteristics when switching the potential of the node n10 (refer to FIG. 9). Therefore, it is possible to further enhance stability of control including the readout circuit unit 5.

As described above, in the solid-state imaging element 200 according to the present embodiment, characteristics of the passive circuits connected to the signal lines 13 to 15 are changed by the capacitance and the resistance connected to the signal lines 13 to 15. Therefore, control by the passive circuits more suitable for the signal lines 13 to 15 can be performed.

Third Embodiment

The electronic device 100 according to a third embodiment is different from the electronic device 100 according to the first embodiment in that a part of the signal lines 13 to 15 is driven in both directions. In the following description, differences from the electronic device 100 according to the first embodiment will be described.

Figure 17:
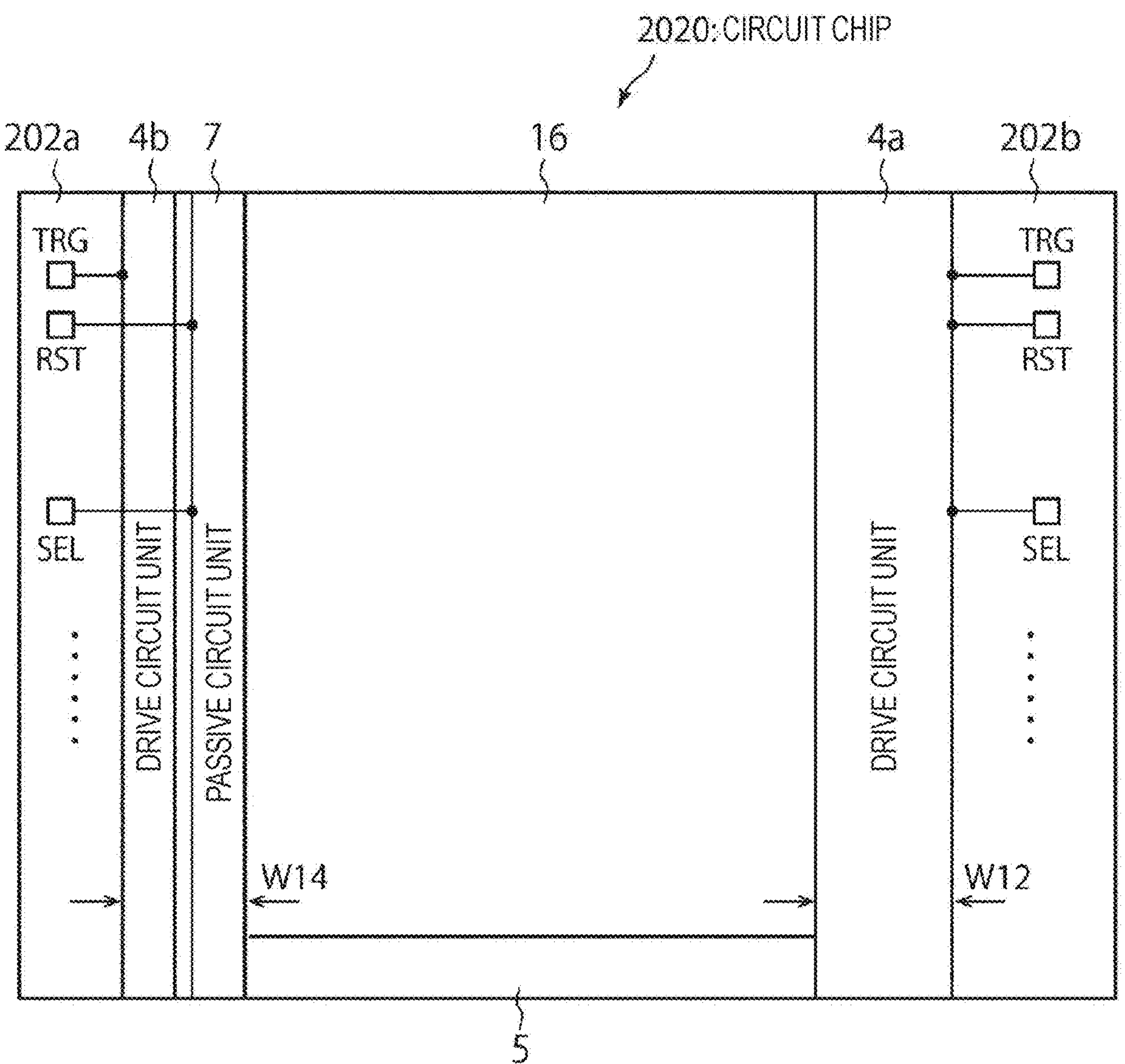
FIG. 17 is a plan view illustrating a configuration example of a circuit chip according to the second embodiment.

FIG. 17 is a plan view illustrating a configuration example of a circuit chip 2020 according to the second embodiment. The circuit chip 2020 includes a drive circuit unit 4*a*, a drive circuit unit 4*b* corresponding to the drive circuit unit 4*a*, the readout circuit unit 5, the passive circuit unit 7, the signal processing unit 16, and connection units 202*a* and 202*b*. That is, the circuit chip 2020 is different from the circuit chip 202 according to the first embodiment in that the drive circuit unit 4*a* and the drive circuit unit 4*b* are provided.

As illustrated in FIG. 17, a transfer transistor drive circuit 40*a* (refer to FIG. 2) is provided in the drive circuit unit 4*a*. Therefore, the transfer transistor drive circuit 40*a* that drives the transfer transistor in synchronization is connected to both ends of the signal line 13. Therefore, as illustrated in FIG. 16, an influence of spreading of the skirt of the rectangular wave of the signal TRG can be further suppressed. Note that, in the present embodiment, the signal line 13 is driven in both directions, but the present embodiment is not limited thereto. For example, any one or more of the signal lines 13 to 15 may be driven in both directions.

As illustrated in FIG. 17, a width W14 obtained by adding the width of the drive circuit unit 4*b* in the row direction and the width of the passive circuit unit 7 can be narrower than the width W12 of the drive circuit unit 4*a* in the row direction. As described above, the solid-state imaging element 200 (refer to FIG. 2) can be further downsized as compared with a case where all the signal lines 13 to 15 are driven in both directions.

As described above, in the solid-state imaging element 200 according to the present embodiment, a part of the signal lines 13 to 15 is driven in both directions. Therefore, an influence of spreading of the skirt of the rectangular wave of a partial signal TRG of the signals TRG, RST, and SEL can be further suppressed, and the solid-state imaging element 200 can be further downsized.

Note that the present technology may have the following configurations.

(1)

A solid-state imaging element including:

a plurality of pixel circuits that is driven according to a first signal supplied from a first signal line;

a first drive circuit unit that supplies the first signal from one end side of the first signal line; and a passive circuit unit that supplies a voltage according to a level of the first signal on another end side of the first signal line, from the another end side of the first signal line.

(2)

The solid-state imaging element according to (1), in which a width of the passive circuit unit in a direction in which the plurality of pixel circuits is arranged is narrower than a width of the first drive circuit unit in the direction.

(3)

The solid-state imaging element according to (1), in which the plurality of pixel circuits is further driven according to a second signal supplied from a second signal line, the first drive circuit unit supplies the second signal from one end side of the second signal line, and the solid-state imaging element further comprises a second drive circuit unit that supplies a signal according to the second signal from another end side of the second signal line in synchronization with the first drive circuit unit.

(4)

The solid-state imaging element according to (3), in which a width obtained by adding a width of the second drive circuit unit and a width of the passive circuit unit in a direction in which the plurality of pixel circuits is arranged is narrower than a width of the first drive circuit unit in the direction.

(5)

The solid-state imaging element according to (1), in which the plurality of pixel circuits is further driven according to a third signal supplied from a third signal line, the first drive circuit unit supplies the third signal from one end side of the third signal line, and the passive circuit unit supplies a voltage according to a level of the third signal on another end side of the third signal line from the another end side of the third signal line.

(6)

The solid-state imaging element according to (5), in which the passive circuit unit includes:

a first passive circuit that supplies a voltage according to a level of the first signal from the another end side of the first signal line; and a second passive circuit that supplies a voltage according to a level of the third signal from the another end side of the third signal line.

(7)

The solid-state imaging element according to (6), in which the first passive circuit and the second passive circuit respond at different signal levels.

(8)

The solid-state imaging element according to (1), in which the passive circuit unit includes a passive circuit that supplies a voltage according to a level of the first signal from the another end side of the first signal line, and the passive circuit includes:

a first switching element that is connected between a first potential according to a high level signal of the first signal and the another end of the first signal line;

a second switching element that is connected between a second potential according to a low level signal of the first signal and the another end of the first signal line; and a drive element that brings the first switching element into a conductive state in a case where a signal level of the first signal increases to exceed a first predetermined value, and brings the second switching element into a conductive state in a case where a signal level of the first signal decreases to exceed a second predetermined value.

(9)

The solid-state imaging element according to (8), in which the drive element brings the first switching element into a non-conductive state in a case where the signal level of the first signal is lower than the first predetermined value, and brings the second switching element into a non-conductive state in a case where the signal level of the first signal is equal to or higher than the second predetermined value.

(10)

The solid-state imaging element according to (9), in which the first predetermined value corresponds to a value of a potential higher than the second predetermined value.

(11)

The solid-state imaging element according to (9), in which the first predetermined value and the second predetermined value correspond to a same value.

(12)

The solid-state imaging element according to (9), in which the first switching element and the second switching element are transistors, and the drive element supplies a signal for bringing the first switching element and the second switching element into the conductive state or the non-conductive state to gates of the first switching element and the second switching element on the basis of any one of the first predetermined value and the second predetermined value.

(13)

The solid-state imaging element according to (12), in which the drive element includes:

a first inverter that has one end connected to the another end of the first signal line and another end connected to a gate of the first switching element and has a first drive threshold value corresponding to the first predetermined value; and a second inverter that has one end connected to the another end of the first signal line and another end connected to a gate of the second switching element and has a second drive threshold value corresponding to the second predetermined value.

(14)

The solid-state imaging element according to (12), in which the drive element includes:

a third inverter that has one end connected to another end of the first signal line and another end connected to gates of the first switching element and the second switching element and has a third drive threshold value corresponding to at least one of the first predetermined value or the second predetermined value.

(15)

The solid-state imaging element according to (12), in which the first switching element is a PMOS transistor, and the second switching element is a first NMOS transistor.

(16)

The solid-state imaging element according to (15), in which the drive element includes:

a first resistor that has one end connected to the first potential and another end connected to the another end of the first signal line;

a second resistor that has one end connected to the another end of the first resistor and another end connected to the second potential;

a second NMOS transistor that is connected between predetermined two points of the second resistor;

a third inverter that has one end connected to a gate of the second NMOS transistor and another end connected to a gate of the second switching element and is connected to gates of the first NMOS transistor and the second NMOS transistor; and a comparator that has an inversion terminal connected to the another end of the first signal line, a non-inversion terminal connected to the another end of the first resistor, and an output terminal connected to the another end of the third inverter.

(17)

The solid-state imaging element according to (3), in which the pixel circuit includes:

a photoelectric conversion unit that performs photoelectric conversion on incident light and accumulates signal charges, the first signal is a signal for reading the signal charges accumulated in the photoelectric conversion unit to a floating diffusion region, and the second signal is a signal for resetting the floating diffusion region or a signal for reading signal charges accumulated in the floating diffusion region.

(18)

The solid-state imaging element according to (5), in which the pixel circuit includes:

a photoelectric conversion unit that performs photoelectric conversion on incident light and accumulates signal charges, the first signal is a signal for reading the signal charges accumulated in the photoelectric conversion unit to a floating diffusion region, and the third signal is a signal for resetting the floating diffusion region or a signal for reading signal charges accumulated in the floating diffusion region.

(19)

The solid-state imaging element according to (1), in which a plurality of the first signal lines is provided, a plurality of pixel circuits is provided, the plurality of pixel circuits being driven according to first signals supplied from each of the plurality of first signal lines, the first drive circuit unit supplies the first signals from one end side of each of the plurality of first signal lines, and the passive circuit unit supplies a voltage according to a level of the first signal on another end side of each of the plurality of first signal lines from the another end sides of the first signal lines.

(20)

An electronic device including:

the solid-state imaging element according to (1); and an optical system that guides light for imaging to the solid-state imaging element.

Aspects of the present disclosure are not limited to the above-described individual embodiments, but include various modifications that can be conceived by those skilled in the art, and the effects of the present disclosure are not limited to the above-described contents. That is, various additions, modifications, and partial deletions are possible without departing from the conceptual idea and spirit of the present disclosure derived from the contents defined in the claims and equivalents thereof.

REFERENCE SIGNS LIST

2 Pixel circuit
4, 4*a*, 4*b* Drive circuit unit
7 Passive circuit unit
13 to 15 Signal line
70, 70*a*, 70*b* Passive circuit
702 PMOS transistor
704 NMOS transistor
100 Electronic device
200 Solid-state imaging element
706 First inverter
708 Second inverter
710 Comparator
712 Third inverter
714 MOS transistor
716 Fourth inverter
FD Floating diffusion
PD Photoelectric conversion element
R1, R2 Resistor

The invention claimed is:

1. A solid-state imaging element, comprising:

a plurality of pixel circuits configured to be driven based on a first signal from a first signal line and a second signal from a second signal line;

a first drive circuit unit configured to:

supply the first signal from a first end side of the first signal line; and supply the second signal from a first end side of the second signal line;

a second drive circuit unit configured to supply a third signal, based on the second signal from a second end side of the second signal line, in synchronization with the first drive circuit unit; and a passive circuit unit configured to supply a first voltage based on a level of the first signal on a second end side of the first signal line, wherein the first voltage is supplied from the second end side of the first signal line.

2. The solid-state imaging element according to claim 1, wherein a width of the passive circuit unit in a direction of arrangement of the plurality of pixel circuits is narrower than a width of the first drive circuit unit in the direction.

3. The solid-state imaging element according to claim 1, wherein a width, based on addition of a width of the second drive circuit unit and a width of the passive circuit unit in a direction of arrangement of the plurality of pixel circuits, is narrower than a width of the first drive circuit unit in the direction.

4. The solid-state imaging element according to claim 1, wherein the plurality of pixel circuits is further configured to be driven based on a fourth signal from a third signal line, the first drive circuit unit is further configured to supply the fourth signal from a first end side of the third signal line, and the passive circuit unit is further configured to supply a second voltage from a second end side of the third signal line based on to a level of the fourth signal on the second end side of the third signal line.

5. The solid-state imaging element according to claim 4, wherein the passive circuit unit includes:

a first passive circuit configured to supply a third voltage, based on a level of the first signal, from the second end side of the first signal line; and a second passive circuit configured to supply the second voltage, based on a level of the fourth signal, from the second end side of the third signal line.

6. The solid-state imaging element according to claim 5, wherein the first passive circuit and the second passive circuit are configured to respond at different signal levels.

7. The solid-state imaging element according to claim 4, wherein a pixel circuit of the plurality of pixel circuits includes:

a photoelectric conversion unit configured to:

execute photoelectric conversion on incident light; and accumulate signal charges, the first signal is a signal to read the signal charges accumulated in the photoelectric conversion unit to a floating diffusion region, and the fourth signal is a signal to reset the floating diffusion region, or a signal to read signal charges accumulated in the floating diffusion region.

8. The solid-state imaging element according to claim 1, wherein the passive circuit unit includes a passive circuit configured to supply the first voltage based on a level of the first signal on the second end side of the first signal line, and the passive circuit includes:

a first switching element that is connected between a first potential and the second end side of the first signal line, wherein the first potential is based on a high level signal of the first signal;

a second switching element that is connected between a second potential and the second end side of the first signal line, wherein the second potential is based on a low level signal of the first signal; and a drive element configured to:

bring the first switching element into a conductive state in a case where a signal level of the first signal increases to exceed a first value; and bring the second switching element into a conductive state in a case where the signal level of the first signal decreases below a second value.

9. The solid-state imaging element according to claim 8, wherein the drive element is further configured to:

bring the first switching element into a non-conductive state in a case where the signal level of the first signal is lower than the first value; and bring the second switching element into a non-conductive state in a case where the signal level of the first signal is equal to or higher than the second value.

10. The solid-state imaging element according to claim 9, wherein the first value corresponds to a value of a potential higher than the second value.

11. The solid-state imaging element according to claim 9, wherein the first value and the second value correspond to a same value.

12. The solid-state imaging element according to claim 9, wherein each of the first switching element and the second switching element is a transistor, and the drive element is further configured to supply a fifth signal, to bring the first switching element and the second switching element into the conductive state or the non-conductive state, to a gate of each of the first switching element and the second switching element based on one of the first value and the second value.

13. The solid-state imaging element according to claim 12, wherein the drive element includes:

a first inverter that has a first end connected to the second end side of the first signal line, and a second end connected to the gate of the first switching element, and a first drive threshold value corresponding to the first value; and a second inverter that has a first end connected to the second end side of the first signal line, and a second end connected to the gate of the second switching element, and a second drive threshold value corresponding to the second value.

14. The solid-state imaging element according to claim 12, wherein the drive element includes:

an inverter that has a first end connected to the second end side of the first signal line, and a second end connected to the gate of each of the first switching element and the second switching element, and a drive threshold value corresponding to at least one of the first value or the second value.

15. The solid-state imaging element according to claim 12, wherein the first switching element is a PMOS transistor, and the second switching element is a first NMOS transistor.

16. The solid-state imaging element according to claim 15, wherein the drive element includes:

a first resistor that has a first end connected to the first potential, and a second end connected to the second end side of the first signal line;

a second resistor that has a first end connected to the second end of the first resistor, and a second end connected to the second potential;

a second NMOS transistor that is connected between two points of the second resistor;

an inverter that has a first end connected to a gate of the second NMOS transistor, and a second end connected to the gate of the second switching element, wherein the inverter is connected to the gate of each of the first NMOS transistor and the second NMOS transistor; and a comparator that has an inversion terminal connected to the second end side of the first signal line, a non-inversion terminal connected to the second end of the first resistor, and an output terminal connected to the second end of the inverter.

17. The solid-state imaging element according to claim 1, wherein a pixel circuit of the plurality of pixel circuits includes:

a photoelectric conversion unit configured to:

execute photoelectric conversion on incident light; and accumulate signal charges, the first signal is a signal to read the signal charges accumulated in the photoelectric conversion unit to a floating diffusion region, and the second signal is a signal to reset the floating diffusion region, or a signal to read signal charges accumulated in the floating diffusion region.

18. The solid-state imaging element according to claim 1, further comprising: a plurality of first signal lines that includes the first signal line, wherein the plurality of pixel circuits is configured to be driven based on first signals from each of the plurality of first signal lines, the first signals includes the first signal, the first drive circuit unit is configured to supply the first signals from a first end side of each of the plurality of first signal lines, and the passive circuit unit is configured to supply the first voltage from second end sides of the plurality of first signal lines based on the level of the first signal on a second end side of each of the plurality of first signal lines.

19. An electronic device, comprising:

a solid-state imaging element, comprising:

a plurality of pixel circuits configured to be driven based on a first signal from a first signal line and a second signal from a second signal line;

a first drive circuit unit configured to:

supply the first signal from a first end side of the first signal line; and supply the second signal from a first end side of the second signal line;

a second drive circuit unit configured to supply a third signal, based on the second signal from a second end side of the second signal line, in synchronization with the first drive circuit unit; and a passive circuit unit configured to supply a voltage based on a level of the first signal on a second end side of the first signal line, wherein the voltage is supplied from the second end side of the first signal line; and an optical system configured to guide light for an imaging process to the solid-state imaging element.

* * * * *